United States Patent
Chaji et al.

(10) Patent No.: US 9,818,323 B2
(45) Date of Patent: *Nov. 14, 2017

(54) RE-INTERPOLATION WITH EDGE DETECTION FOR EXTRACTING AN AGING PATTERN FOR AMOLED DISPLAYS

(71) Applicant: Ignis Innovation Inc., Waterloo (CA)

(72) Inventors: Gholamreza Chaji, Waterloo (CA); Mehdi Torbatian, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,290

(22) Filed: Nov. 29, 2016

(65) Prior Publication Data

US 2017/0092167 A1 Mar. 30, 2017

Related U.S. Application Data

(63) Continuation of application No. 15/050,700, filed on Feb. 23, 2016, now Pat. No. 9,536,465, which is a
(Continued)

(51) Int. Cl.
*G09G 3/00* (2006.01)
*G09G 3/3233* (2016.01)
*G09G 3/20* (2006.01)

(52) U.S. Cl.
CPC .......... *G09G 3/006* (2013.01); *G09G 3/2003* (2013.01); *G09G 3/2085* (2013.01);
(Continued)

(58) Field of Classification Search
CPC ...................................... G09G 5/02
See application file for complete search history.

(56) References Cited

U.S. PATENT DOCUMENTS

| | | | |
|---|---|---|---|
| 3,506,851 A | 4/1970 | Polkinghorn | |
| 3,774,055 A | 11/1973 | Bapat | |

(Continued)

FOREIGN PATENT DOCUMENTS

| | | |
|---|---|---|
| CA | 1 294 034 | 1/1992 |
| CA | 2 109 951 | 11/1992 |

(Continued)

OTHER PUBLICATIONS

Ahnood : "Effect of threshold voltage instability on field effect mobility in thin film transistors deduced from constant current measurements"; dated Aug. 2009.
(Continued)

*Primary Examiner* — Phi Hoang
(74) *Attorney, Agent, or Firm* — Nixon Peabody LLP

(57) ABSTRACT

A method that includes an initial uniform pixel measurement and interpolation followed by an edge detection algorithm to recognize the areas that contribute mostly to the estimation error due to the interpolation. The pixels on the detected edges and around their vicinity are also measured, and an aging pattern of the entire display is obtained by re-interpolating the entire measured set of data for the initially measured pixels as well as the pixels around the detected edges. The estimation error is reduced particularly in the presence of aging patterns having highly spatially correlated areas with distinctive edges.

13 Claims, 14 Drawing Sheets

Related U.S. Application Data continuation of application No. 14/209,392, filed on Mar. 13, 2014, now Pat. No. 9,305,488.

(60) Provisional application No. 61/783,537, filed on Mar. 14, 2013.

(52) U.S. Cl.
CPC ... *G09G 3/3233* (2013.01); *G09G 2320/0233* (2013.01); *G09G 2320/0242* (2013.01); *G09G 2320/045* (2013.01)

(56) References Cited

U.S. PATENT DOCUMENTS

| | | |
|---|---|---|
| 4,090,096 A | 5/1978 | Nagami |
| 4,160,934 A | 7/1979 | Kirsch |
| 4,295,091 A | 10/1981 | Ponkala |
| 4,354,162 A | 10/1982 | Wright |
| 4,943,956 A | 7/1990 | Noro |
| 4,996,523 A | 2/1991 | Bell |
| 5,153,420 A | 10/1992 | Hack |
| 5,198,803 A | 3/1993 | Shie |
| 5,204,661 A | 4/1993 | Hack |
| 5,266,515 A | 11/1993 | Robb |
| 5,489,918 A | 2/1996 | Mosier |
| 5,498,880 A | 3/1996 | Lee |
| 5,557,342 A | 9/1996 | Eto |
| 5,561,381 A | 10/1996 | Jenkins et al. |
| 5,572,444 A | 11/1996 | Lentz |
| 5,589,847 A | 12/1996 | Lewis |
| 5,619,033 A | 4/1997 | Weisfield |
| 5,648,276 A | 7/1997 | Hara |
| 5,670,973 A | 9/1997 | Bassetti |
| 5,684,365 A | 11/1997 | Tang |
| 5,691,783 A | 11/1997 | Numao |
| 5,714,968 A | 2/1998 | Ikeda |
| 5,723,950 A | 3/1998 | Wei |
| 5,744,824 A | 4/1998 | Kousai |
| 5,745,660 A | 4/1998 | Kolpatzik |
| 5,748,160 A | 5/1998 | Shieh |
| 5,815,303 A | 9/1998 | Berlin |
| 5,870,071 A | 2/1999 | Kawahata |
| 5,874,803 A | 2/1999 | Garbuzov |
| 5,880,582 A | 3/1999 | Sawada |
| 5,903,248 A | 5/1999 | Irwin |
| 5,917,280 A | 6/1999 | Burrows |
| 5,923,794 A | 7/1999 | McGrath |
| 5,945,972 A | 8/1999 | Okumura |
| 5,949,398 A | 9/1999 | Kim |
| 5,952,789 A | 9/1999 | Stewart |
| 5,952,991 A | 9/1999 | Akiyama |
| 5,982,104 A | 11/1999 | Sasaki |
| 5,990,629 A | 11/1999 | Yamada |
| 6,023,259 A | 2/2000 | Howard |
| 6,069,365 A | 5/2000 | Chow |
| 6,091,203 A | 7/2000 | Kawashima |
| 6,097,360 A | 8/2000 | Holloman |
| 6,144,222 A | 11/2000 | Ho |
| 6,177,915 B1 | 1/2001 | Beeteson |
| 6,229,506 B1 | 5/2001 | Dawson |
| 6,229,508 B1 | 5/2001 | Kane |
| 6,246,180 B1 | 6/2001 | Nishigaki |
| 6,252,248 B1 | 6/2001 | Sano |
| 6,259,424 B1 | 7/2001 | Kurogane |
| 6,262,589 B1 | 7/2001 | Tamukai |
| 6,271,825 B1 | 8/2001 | Greene |
| 6,288,696 B1 | 9/2001 | Holloman |
| 6,304,039 B1 | 10/2001 | Appelberg |
| 6,307,322 B1 | 10/2001 | Dawson |
| 6,310,962 B1 | 10/2001 | Chung |
| 6,320,325 B1 | 11/2001 | Cok |
| 6,323,631 B1 | 11/2001 | Juang |
| 6,329,971 B2 | 12/2001 | McKnight |
| 6,356,029 B1 | 3/2002 | Hunter |
| 6,373,454 B1 | 4/2002 | Knapp |
| 6,377,237 B1 | 4/2002 | Sojourner |
| 6,392,617 B1 | 5/2002 | Gleason |
| 6,404,139 B1 | 6/2002 | Sasaki et al. |
| 6,414,661 B1 | 7/2002 | Shen |
| 6,417,825 B1 | 7/2002 | Stewart |
| 6,433,488 B1 | 8/2002 | Bu |
| 6,437,106 B1 | 8/2002 | Stoner |
| 6,445,369 B1 | 9/2002 | Yang |
| 6,475,845 B2 | 11/2002 | Kimura |
| 6,501,098 B2 | 12/2002 | Yamazaki |
| 6,501,466 B1 | 12/2002 | Yamagishi |
| 6,518,962 B2 | 2/2003 | Kimura |
| 6,522,315 B2 | 2/2003 | Ozawa |
| 6,525,683 B1 | 2/2003 | Gu |
| 6,531,827 B2 | 3/2003 | Kawashima |
| 6,541,921 B1 | 4/2003 | Luciano, Jr. et al. |
| 6,542,138 B1 | 4/2003 | Shannon |
| 6,555,420 B1 | 4/2003 | Yamazaki |
| 6,577,302 B2 | 6/2003 | Hunter |
| 6,580,408 B1 | 6/2003 | Bae |
| 6,580,657 B2 | 6/2003 | Sanford |
| 6,583,398 B2 | 6/2003 | Harkin |
| 6,583,775 B1 | 6/2003 | Sekiya |
| 6,594,606 B2 | 7/2003 | Everitt |
| 6,618,030 B2 | 9/2003 | Kane |
| 6,639,244 B1 | 10/2003 | Yamazaki |
| 6,668,645 B1 | 12/2003 | Gilmour |
| 6,677,713 B1 | 1/2004 | Sung |
| 6,680,580 B1 | 1/2004 | Sung |
| 6,687,266 B1 | 2/2004 | Ma |
| 6,690,000 B1 | 2/2004 | Muramatsu |
| 6,690,344 B1 | 2/2004 | Takeuchi |
| 6,693,388 B2 | 2/2004 | Oomura |
| 6,693,610 B2 | 2/2004 | Shannon |
| 6,697,057 B2 | 2/2004 | Koyama |
| 6,720,942 B2 | 4/2004 | Lee |
| 6,724,151 B2 | 4/2004 | Yoo |
| 6,734,636 B2 | 5/2004 | Sanford |
| 6,738,034 B2 | 5/2004 | Kaneko |
| 6,738,035 B1 | 5/2004 | Fan |
| 6,753,655 B2 | 6/2004 | Shih |
| 6,753,834 B2 | 6/2004 | Mikami |
| 6,756,741 B2 | 6/2004 | Li |
| 6,756,952 B1 | 6/2004 | Decaux |
| 6,756,958 B2 | 6/2004 | Furuhashi |
| 6,765,549 B1 | 7/2004 | Yamazaki et al. |
| 6,771,028 B1 | 8/2004 | Winters |
| 6,777,712 B2 | 8/2004 | Sanford |
| 6,777,888 B2 | 8/2004 | Kondo |
| 6,781,567 B2 | 8/2004 | Kimura |
| 6,806,497 B2 | 10/2004 | Jo |
| 6,806,638 B2 | 10/2004 | Lih et al. |
| 6,806,857 B2 | 10/2004 | Sempel |
| 6,809,706 B2 | 10/2004 | Shimoda |
| 6,815,975 B2 | 11/2004 | Nara |
| 6,828,950 B2 | 12/2004 | Koyama |
| 6,853,371 B2 | 2/2005 | Miyajima |
| 6,859,193 B1 | 2/2005 | Yumoto |
| 6,873,117 B2 | 3/2005 | Ishizuka |
| 6,876,346 B2 | 4/2005 | Anzai |
| 6,885,356 B2 | 4/2005 | Hashimoto |
| 6,900,485 B2 | 5/2005 | Lee |
| 6,903,734 B2 | 6/2005 | Eu |
| 6,909,243 B2 | 6/2005 | Inukai |
| 6,909,419 B2 | 6/2005 | Zavracky |
| 6,911,960 B1 | 6/2005 | Yokoyama |
| 6,911,964 B2 | 6/2005 | Lee |
| 6,914,448 B2 | 7/2005 | Jinno |
| 6,919,871 B2 | 7/2005 | Kwon |
| 6,924,602 B2 | 8/2005 | Komiya |
| 6,937,215 B2 | 8/2005 | Lo |
| 6,937,220 B2 | 8/2005 | Kitaura |
| 6,940,214 B1 | 9/2005 | Komiya |
| 6,943,500 B2 | 9/2005 | LeChevalier |
| 6,947,022 B2 | 9/2005 | McCartney |
| 6,954,194 B2 | 10/2005 | Matsumoto |
| 6,956,547 B2 | 10/2005 | Bae |
| 6,975,142 B2 | 12/2005 | Azami |

(56) References Cited

U.S. PATENT DOCUMENTS

| | | |
|---|---|---|
| 6,975,332 B2 | 12/2005 | Arnold |
| 6,995,510 B2 | 2/2006 | Murakami |
| 6,995,519 B2 | 2/2006 | Arnold |
| 7,023,408 B2 | 4/2006 | Chen |
| 7,027,015 B2 | 4/2006 | Booth, Jr. |
| 7,027,078 B2 | 4/2006 | Reihl |
| 7,034,793 B2 | 4/2006 | Sekiya |
| 7,038,392 B2 | 5/2006 | Libsch |
| 7,053,875 B2 | 5/2006 | Chou |
| 7,057,359 B2 | 6/2006 | Hung |
| 7,061,451 B2 | 6/2006 | Kimura |
| 7,064,733 B2 | 6/2006 | Cok |
| 7,071,932 B2 | 7/2006 | Libsch |
| 7,088,051 B1 | 8/2006 | Cok |
| 7,088,052 B2 | 8/2006 | Kimura |
| 7,102,378 B2 | 9/2006 | Kuo |
| 7,106,285 B2 | 9/2006 | Naugler |
| 7,112,820 B2 | 9/2006 | Change |
| 7,116,058 B2 | 10/2006 | Lo |
| 7,119,493 B2 | 10/2006 | Fryer |
| 7,122,835 B1 | 10/2006 | Ikeda |
| 7,127,380 B1 | 10/2006 | Iverson |
| 7,129,914 B2 | 10/2006 | Knapp |
| 7,161,566 B2 | 1/2007 | Cok |
| 7,164,417 B2 | 1/2007 | Cok |
| 7,193,589 B2 | 3/2007 | Yoshida |
| 7,224,332 B2 | 5/2007 | Cok |
| 7,227,519 B1 | 6/2007 | Kawase |
| 7,245,277 B2 | 7/2007 | Ishizuka |
| 7,246,912 B2 | 7/2007 | Burger et al. |
| 7,248,236 B2 | 7/2007 | Nathan |
| 7,262,753 B2 | 8/2007 | Tanghe |
| 7,274,363 B2 | 9/2007 | Ishizuka |
| 7,310,092 B2 | 12/2007 | Imamura |
| 7,315,295 B2 | 1/2008 | Kimura |
| 7,321,348 B2 | 1/2008 | Cok |
| 7,339,560 B2 | 3/2008 | Sun |
| 7,355,574 B1 | 4/2008 | Leon |
| 7,358,941 B2 | 4/2008 | Ono |
| 7,368,868 B2 | 5/2008 | Sakamoto |
| 7,397,485 B2 | 7/2008 | Miller |
| 7,411,571 B2 | 8/2008 | Huh |
| 7,414,600 B2 | 8/2008 | Nathan |
| 7,423,617 B2 | 9/2008 | Giraldo |
| 7,453,054 B2 | 11/2008 | Lee |
| 7,474,285 B2 | 1/2009 | Kimura |
| 7,502,000 B2 | 3/2009 | Yuki |
| 7,528,812 B2 | 5/2009 | Tsuge |
| 7,535,449 B2 | 5/2009 | Miyazawa |
| 7,554,512 B2 | 6/2009 | Steer |
| 7,569,849 B2 | 8/2009 | Nathan |
| 7,576,718 B2 | 8/2009 | Miyazawa |
| 7,580,012 B2 | 8/2009 | Kim |
| 7,589,707 B2 | 9/2009 | Chou |
| 7,605,792 B2 | 10/2009 | Son |
| 7,609,239 B2 | 10/2009 | Chang |
| 7,619,594 B2 | 11/2009 | Hu |
| 7,619,597 B2 | 11/2009 | Nathan |
| 7,633,470 B2 | 12/2009 | Kane |
| 7,656,370 B2 | 2/2010 | Schneider |
| 7,675,485 B2 | 3/2010 | Steer |
| 7,800,558 B2 | 9/2010 | Routley |
| 7,847,764 B2 | 12/2010 | Cok |
| 7,859,492 B2 | 12/2010 | Kohno |
| 7,868,859 B2 | 1/2011 | Tomida |
| 7,876,294 B2 | 1/2011 | Sasaki |
| 7,924,249 B2 | 4/2011 | Nathan |
| 7,932,883 B2 | 4/2011 | Klompenhouwer |
| 7,969,390 B2 | 6/2011 | Yoshida |
| 7,978,187 B2 | 7/2011 | Nathan |
| 7,994,712 B2 | 8/2011 | Sung |
| 8,026,876 B2 | 9/2011 | Nathan |
| 8,031,180 B2 | 10/2011 | Miyamoto et al. |
| 8,049,420 B2 | 11/2011 | Tamura |
| 8,077,123 B2 | 12/2011 | Naugler, Jr. |
| 8,115,707 B2 | 2/2012 | Nathan |
| 8,208,084 B2 | 6/2012 | Lin |
| 8,223,177 B2 | 7/2012 | Nathan |
| 8,232,939 B2 | 7/2012 | Nathan |
| 8,259,044 B2 | 9/2012 | Nathan |
| 8,264,431 B2 | 9/2012 | Bulovic |
| 8,279,143 B2 | 10/2012 | Nathan |
| 8,294,696 B2 | 10/2012 | Min et al. |
| 8,314,783 B2 | 11/2012 | Sambandan et al. |
| 8,339,386 B2 | 12/2012 | Leon |
| 8,441,206 B2 | 5/2013 | Myers |
| 8,493,296 B2 | 7/2013 | Ogawa |
| 8,581,809 B2 | 11/2013 | Nathan et al. |
| 9,125,278 B2 | 9/2015 | Nathan et al. |
| 2001/0002703 A1 | 6/2001 | Koyama |
| 2001/0009283 A1 | 7/2001 | Arao |
| 2001/0024181 A1 | 9/2001 | Kubota |
| 2001/0024186 A1 | 9/2001 | Kane |
| 2001/0026257 A1 | 10/2001 | Kimura |
| 2001/0030323 A1 | 10/2001 | Ikeda |
| 2001/0035863 A1 | 11/2001 | Kimura |
| 2001/0038367 A1 | 11/2001 | Inukai |
| 2001/0040541 A1 | 11/2001 | Yoneda |
| 2001/0043173 A1 | 11/2001 | Troutman |
| 2001/0045929 A1 | 11/2001 | Prache |
| 2001/0052606 A1 | 12/2001 | Sempel |
| 2001/0052940 A1 | 12/2001 | Hagihara |
| 2002/0000576 A1 | 1/2002 | Inukai |
| 2002/0011796 A1 | 1/2002 | Koyama |
| 2002/0011799 A1 | 1/2002 | Kimura |
| 2002/0012057 A1 | 1/2002 | Kimura |
| 2002/0014851 A1 | 2/2002 | Tai |
| 2002/0018034 A1 | 2/2002 | Ohki |
| 2002/0030190 A1 | 3/2002 | Ohtani |
| 2002/0047565 A1 | 4/2002 | Nara |
| 2002/0052086 A1 | 5/2002 | Maeda |
| 2002/0067134 A1 | 6/2002 | Kawashima |
| 2002/0084463 A1 | 7/2002 | Sanford |
| 2002/0101152 A1 | 8/2002 | Kimura |
| 2002/0101172 A1 | 8/2002 | Bu |
| 2002/0105279 A1 | 8/2002 | Kimura |
| 2002/0117722 A1 | 8/2002 | Osada |
| 2002/0122308 A1 | 9/2002 | Ikeda |
| 2002/0158587 A1 | 10/2002 | Komiya |
| 2002/0158666 A1 | 10/2002 | Azami |
| 2002/0158823 A1 | 10/2002 | Zavracky |
| 2002/0167471 A1 | 11/2002 | Everitt |
| 2002/0167474 A1 | 11/2002 | Everitt |
| 2002/0169575 A1 | 11/2002 | Everitt |
| 2002/0180369 A1 | 12/2002 | Koyama |
| 2002/0180721 A1 | 12/2002 | Kimura |
| 2002/0181276 A1 | 12/2002 | Yamazaki |
| 2002/0183945 A1 | 12/2002 | Everitt |
| 2002/0186214 A1 | 12/2002 | Siwinski |
| 2002/0190924 A1 | 12/2002 | Asano |
| 2002/0190971 A1 | 12/2002 | Nakamura |
| 2002/0195967 A1 | 12/2002 | Kim |
| 2002/0195968 A1 | 12/2002 | Sanford |
| 2003/0020413 A1 | 1/2003 | Oomura |
| 2003/0030603 A1 | 2/2003 | Shimoda |
| 2003/0043088 A1 | 3/2003 | Booth |
| 2003/0057895 A1 | 3/2003 | Kimura |
| 2003/0058226 A1 | 3/2003 | Bertram |
| 2003/0062524 A1 | 4/2003 | Kimura |
| 2003/0063081 A1 | 4/2003 | Kimura |
| 2003/0071821 A1 | 4/2003 | Sundahl |
| 2003/0076048 A1 | 4/2003 | Rutherford |
| 2003/0090447 A1 | 5/2003 | Kimura |
| 2003/0090481 A1 | 5/2003 | Kimura |
| 2003/0107560 A1 | 6/2003 | Yumoto |
| 2003/0111966 A1 | 6/2003 | Mikami |
| 2003/0122745 A1 | 7/2003 | Miyazawa |
| 2003/0122749 A1 | 7/2003 | Booth, Jr. et al. |
| 2003/0122813 A1 | 7/2003 | Ishizuki |
| 2003/0142088 A1 | 7/2003 | LeChevalier |
| 2003/0146897 A1 | 8/2003 | Hunter |
| 2003/0151569 A1 | 8/2003 | Lee |
| 2003/0156101 A1 | 8/2003 | Le Chevalier |
| 2003/0169241 A1 | 9/2003 | LeChevalier |

(56) References Cited

U.S. PATENT DOCUMENTS

| | | |
|---|---|---|
| 2003/0174152 A1 | 9/2003 | Noguchi |
| 2003/0179626 A1 | 9/2003 | Sanford |
| 2003/0185438 A1 | 10/2003 | Osawa |
| 2003/0197663 A1 | 10/2003 | Lee |
| 2003/0210256 A1 | 11/2003 | Mori |
| 2003/0230141 A1 | 12/2003 | Gilmour |
| 2003/0230980 A1 | 12/2003 | Forrest |
| 2003/0231148 A1 | 12/2003 | Lin |
| 2004/0032382 A1 | 2/2004 | Cok |
| 2004/0041750 A1 | 3/2004 | Abe |
| 2004/0066357 A1 | 4/2004 | Kawasaki |
| 2004/0070557 A1 | 4/2004 | Asano |
| 2004/0070565 A1 | 4/2004 | Nayar |
| 2004/0090186 A1 | 5/2004 | Kanauchi |
| 2004/0090400 A1 | 5/2004 | Yoo |
| 2004/0095297 A1 | 5/2004 | Libsch |
| 2004/0100427 A1 | 5/2004 | Miyazawa |
| 2004/0108518 A1 | 6/2004 | Jo |
| 2004/0135749 A1 | 7/2004 | Kondakov |
| 2004/0140982 A1 | 7/2004 | Pate |
| 2004/0145547 A1 | 7/2004 | Oh |
| 2004/0150592 A1 | 8/2004 | Mizukoshi |
| 2004/0150594 A1 | 8/2004 | Koyama |
| 2004/0150595 A1 | 8/2004 | Kasai |
| 2004/0155841 A1 | 8/2004 | Kasai |
| 2004/0174347 A1 | 9/2004 | Sun |
| 2004/0174349 A1 | 9/2004 | Libsch |
| 2004/0174354 A1 | 9/2004 | Ono |
| 2004/0178743 A1 | 9/2004 | Miller |
| 2004/0183759 A1 | 9/2004 | Stevenson |
| 2004/0196275 A1 | 10/2004 | Hattori |
| 2004/0207615 A1 | 10/2004 | Yumoto |
| 2004/0227697 A1 | 11/2004 | Mori |
| 2004/0233125 A1 | 11/2004 | Tanghe |
| 2004/0239596 A1 | 12/2004 | Ono |
| 2004/0246246 A1 | 12/2004 | Tobita |
| 2004/0252089 A1 | 12/2004 | Ono |
| 2004/0257313 A1 | 12/2004 | Kawashima |
| 2004/0257353 A1 | 12/2004 | Imamura |
| 2004/0257355 A1 | 12/2004 | Naugler |
| 2004/0263437 A1 | 12/2004 | Hattori |
| 2004/0263444 A1 | 12/2004 | Kimura |
| 2004/0263445 A1 | 12/2004 | Inukai |
| 2004/0263541 A1 | 12/2004 | Takeuchi |
| 2005/0007355 A1 | 1/2005 | Miura |
| 2005/0007357 A1 | 1/2005 | Yamashita |
| 2005/0007392 A1 | 1/2005 | Kasai |
| 2005/0017650 A1 | 1/2005 | Fryer |
| 2005/0024081 A1 | 2/2005 | Kuo |
| 2005/0024393 A1 | 2/2005 | Kondo |
| 2005/0030267 A1 | 2/2005 | Tanghe |
| 2005/0057484 A1 | 3/2005 | Diefenbaugh |
| 2005/0057580 A1 | 3/2005 | Yamano |
| 2005/0067970 A1 | 3/2005 | Libsch |
| 2005/0067971 A1 | 3/2005 | Kane |
| 2005/0068270 A1 | 3/2005 | Awakura |
| 2005/0068275 A1 | 3/2005 | Kane |
| 2005/0073264 A1 | 4/2005 | Matsumoto |
| 2005/0083323 A1 | 4/2005 | Suzuki |
| 2005/0088103 A1 | 4/2005 | Kageyama |
| 2005/0105031 A1 | 5/2005 | Shih |
| 2005/0110420 A1 | 5/2005 | Arnold |
| 2005/0110807 A1 | 5/2005 | Chang |
| 2005/0122294 A1 | 6/2005 | Ben-David |
| 2005/0140598 A1 | 6/2005 | Kim |
| 2005/0140610 A1 | 6/2005 | Smith |
| 2005/0145891 A1 | 7/2005 | Abe |
| 2005/0156831 A1 | 7/2005 | Yamazaki |
| 2005/0162079 A1 | 7/2005 | Sakamoto |
| 2005/0168416 A1 | 8/2005 | Hashimoto |
| 2005/0179626 A1 | 8/2005 | Yuki |
| 2005/0179628 A1 | 8/2005 | Kimura |
| 2005/0185200 A1 | 8/2005 | Tobol |
| 2005/0200575 A1 | 9/2005 | Kim |
| 2005/0206590 A1 | 9/2005 | Sasaki |
| 2005/0212787 A1 | 9/2005 | Noguchi |
| 2005/0219184 A1 | 10/2005 | Zehner |
| 2005/0225683 A1 | 10/2005 | Nozawa |
| 2005/0248515 A1 | 11/2005 | Naugler |
| 2005/0269959 A1 | 12/2005 | Uchino |
| 2005/0269960 A1 | 12/2005 | Ono |
| 2005/0280615 A1 | 12/2005 | Cok |
| 2005/0280766 A1 | 12/2005 | Johnson |
| 2005/0285822 A1 | 12/2005 | Reddy |
| 2005/0285825 A1 | 12/2005 | Eom |
| 2006/0001613 A1 | 1/2006 | Routley |
| 2006/0007072 A1 | 1/2006 | Choi |
| 2006/0007206 A1 | 1/2006 | Reddy et al. |
| 2006/0007249 A1 | 1/2006 | Reddy |
| 2006/0012310 A1 | 1/2006 | Chen |
| 2006/0012311 A1 | 1/2006 | Ogawa |
| 2006/0015272 A1 | 1/2006 | Giraldo et al. |
| 2006/0022305 A1 | 2/2006 | Yamashita |
| 2006/0022907 A1 | 2/2006 | Uchino et al. |
| 2006/0027807 A1 | 2/2006 | Nathan |
| 2006/0030084 A1 | 2/2006 | Young |
| 2006/0038501 A1 | 2/2006 | Koyama et al. |
| 2006/0038758 A1 | 2/2006 | Routley |
| 2006/0038762 A1 | 2/2006 | Chou |
| 2006/0044227 A1 | 3/2006 | Hadcock |
| 2006/0061248 A1 | 3/2006 | Cok |
| 2006/0066533 A1 | 3/2006 | Sato |
| 2006/0077134 A1 | 4/2006 | Hector et al. |
| 2006/0077135 A1 | 4/2006 | Cok |
| 2006/0077142 A1 | 4/2006 | Kwon |
| 2006/0082523 A1 | 4/2006 | Guo |
| 2006/0092185 A1 | 5/2006 | Jo |
| 2006/0097628 A1 | 5/2006 | Suh |
| 2006/0097631 A1 | 5/2006 | Lee |
| 2006/0103324 A1 | 5/2006 | Kim et al. |
| 2006/0103611 A1 | 5/2006 | Choi |
| 2006/0125740 A1 | 6/2006 | Shirasaki et al. |
| 2006/0149493 A1 | 7/2006 | Sambandan |
| 2006/0170623 A1 | 8/2006 | Naugler, Jr. |
| 2006/0176250 A1 | 8/2006 | Nathan |
| 2006/0208961 A1 | 9/2006 | Nathan |
| 2006/0208971 A1 | 9/2006 | Deane |
| 2006/0214888 A1 | 9/2006 | Schneider |
| 2006/0231740 A1 | 10/2006 | Kasai |
| 2006/0232522 A1 | 10/2006 | Roy |
| 2006/0244697 A1 | 11/2006 | Lee |
| 2006/0256048 A1 | 11/2006 | Fish et al. |
| 2006/0261841 A1 | 11/2006 | Fish |
| 2006/0273997 A1 | 12/2006 | Nathan |
| 2006/0279481 A1 | 12/2006 | Haruna |
| 2006/0284801 A1 | 12/2006 | Yoon |
| 2006/0284802 A1 | 12/2006 | Kohno |
| 2006/0284895 A1 | 12/2006 | Marcu |
| 2006/0290614 A1 | 12/2006 | Nathan |
| 2006/0290618 A1 | 12/2006 | Goto |
| 2007/0001937 A1 | 1/2007 | Park |
| 2007/0001939 A1 | 1/2007 | Hashimoto |
| 2007/0008251 A1 | 1/2007 | Kohno |
| 2007/0008268 A1 | 1/2007 | Park |
| 2007/0008297 A1 | 1/2007 | Bassetti |
| 2007/0057873 A1 | 3/2007 | Uchino |
| 2007/0057874 A1 | 3/2007 | Le Roy |
| 2007/0069998 A1 | 3/2007 | Naugler |
| 2007/0075727 A1 | 4/2007 | Nakano |
| 2007/0076226 A1 | 4/2007 | Klompenhouwer |
| 2007/0080905 A1 | 4/2007 | Takahara |
| 2007/0080906 A1 | 4/2007 | Tanabe |
| 2007/0080908 A1 | 4/2007 | Nathan |
| 2007/0097038 A1 | 5/2007 | Yamazaki |
| 2007/0097041 A1 | 5/2007 | Park |
| 2007/0103411 A1 | 5/2007 | Cok et al. |
| 2007/0103419 A1 | 5/2007 | Uchino |
| 2007/0115221 A1 | 5/2007 | Buchhauser |
| 2007/0126672 A1 | 6/2007 | Tada et al. |
| 2007/0164664 A1 | 7/2007 | Ludwicki |
| 2007/0164937 A1 | 7/2007 | Jung et al. |
| 2007/0164938 A1 | 7/2007 | Shin |
| 2007/0182671 A1 | 8/2007 | Nathan |
| 2007/0236134 A1 | 10/2007 | Ho |

(56) References Cited

U.S. PATENT DOCUMENTS

| | | |
|---|---|---|
| 2007/0236440 A1 | 10/2007 | Wacyk |
| 2007/0236517 A1 | 10/2007 | Kimpe |
| 2007/0241999 A1 | 10/2007 | Lin |
| 2007/0273294 A1 | 11/2007 | Nagayama |
| 2007/0285359 A1 | 12/2007 | Ono |
| 2007/0290957 A1 | 12/2007 | Cok |
| 2007/0290958 A1 | 12/2007 | Cok |
| 2007/0296672 A1 | 12/2007 | Kim |
| 2008/0001525 A1 | 1/2008 | Chao |
| 2008/0001544 A1 | 1/2008 | Murakami |
| 2008/0030518 A1 | 2/2008 | Higgins |
| 2008/0036706 A1 | 2/2008 | Kitazawa |
| 2008/0036708 A1 | 2/2008 | Shirasaki |
| 2008/0042942 A1 | 2/2008 | Takahashi |
| 2008/0042948 A1 | 2/2008 | Yamashita |
| 2008/0048951 A1 | 2/2008 | Naugler, Jr. |
| 2008/0055209 A1 | 3/2008 | Cok |
| 2008/0055211 A1 | 3/2008 | Ogawa |
| 2008/0074413 A1 | 3/2008 | Ogura |
| 2008/0088549 A1 | 4/2008 | Nathan |
| 2008/0088648 A1 | 4/2008 | Nathan |
| 2008/0111766 A1 | 5/2008 | Uchino |
| 2008/0116787 A1 | 5/2008 | Hsu |
| 2008/0117144 A1 | 5/2008 | Nakano et al. |
| 2008/0136770 A1 | 6/2008 | Peker et al. |
| 2008/0150845 A1 | 6/2008 | Ishii |
| 2008/0150847 A1 | 6/2008 | Kim |
| 2008/0158115 A1 | 7/2008 | Cordes |
| 2008/0158648 A1 | 7/2008 | Cummings |
| 2008/0191976 A1 | 8/2008 | Nathan |
| 2008/0198103 A1 | 8/2008 | Toyomura |
| 2008/0211749 A1 | 9/2008 | Weitbruch |
| 2008/0218451 A1 | 9/2008 | Miyamoto |
| 2008/0231558 A1 | 9/2008 | Naugler |
| 2008/0231562 A1 | 9/2008 | Kwon |
| 2008/0231625 A1 | 9/2008 | Minami |
| 2008/0246713 A1 | 10/2008 | Lee |
| 2008/0252223 A1 | 10/2008 | Toyoda |
| 2008/0252571 A1 | 10/2008 | Hente |
| 2008/0259020 A1 | 10/2008 | Fisekovic |
| 2008/0290805 A1 | 11/2008 | Yamada |
| 2008/0297055 A1 | 12/2008 | Miyake |
| 2009/0033598 A1 | 2/2009 | Suh |
| 2009/0058772 A1 | 3/2009 | Lee |
| 2009/0109142 A1 | 4/2009 | Takahara |
| 2009/0121994 A1 | 5/2009 | Miyata |
| 2009/0146926 A1 | 6/2009 | Sung |
| 2009/0160743 A1 | 6/2009 | Tomida |
| 2009/0174628 A1 | 7/2009 | Wang |
| 2009/0184901 A1 | 7/2009 | Kwon |
| 2009/0195483 A1 | 8/2009 | Naugler, Jr. |
| 2009/0201281 A1 | 8/2009 | Routley |
| 2009/0206764 A1 | 8/2009 | Schemmann |
| 2009/0207160 A1 | 8/2009 | Shirasaki et al. |
| 2009/0213046 A1 | 8/2009 | Nam |
| 2009/0244046 A1 | 10/2009 | Seto |
| 2009/0262047 A1 | 10/2009 | Yamashita |
| 2010/0004891 A1 | 1/2010 | Ahlers |
| 2010/0026725 A1 | 2/2010 | Smith |
| 2010/0039422 A1 | 2/2010 | Seto |
| 2010/0039458 A1 | 2/2010 | Nathan |
| 2010/0045646 A1 | 2/2010 | Kishi |
| 2010/0045650 A1 | 2/2010 | Fish et al. |
| 2010/0060911 A1 | 3/2010 | Marcu |
| 2010/0073335 A1 | 3/2010 | Min et al. |
| 2010/0073357 A1 | 3/2010 | Min et al. |
| 2010/0079419 A1 | 4/2010 | Shibusawa |
| 2010/0085282 A1 | 4/2010 | Yu |
| 2010/0103160 A1 | 4/2010 | Jeon |
| 2010/0134469 A1 | 6/2010 | Ogura et al. |
| 2010/0134475 A1 | 6/2010 | Ogura et al. |
| 2010/0165002 A1 | 7/2010 | Ahn |
| 2010/0194670 A1 | 8/2010 | Cok |
| 2010/0207960 A1 | 8/2010 | Kimpe |
| 2010/0225630 A1 | 9/2010 | Levey |
| 2010/0251295 A1 | 9/2010 | Amento |
| 2010/0277400 A1 | 11/2010 | Jeong |
| 2010/0315319 A1 | 12/2010 | Cok |
| 2011/0050870 A1 | 3/2011 | Hanari |
| 2011/0063197 A1 | 3/2011 | Chung |
| 2011/0069051 A1 | 3/2011 | Nakamura |
| 2011/0069089 A1 | 3/2011 | Kopf |
| 2011/0069096 A1 | 3/2011 | Li |
| 2011/0074750 A1 | 3/2011 | Leon |
| 2011/0074762 A1 | 3/2011 | Shirasaki et al. |
| 2011/0149166 A1 | 6/2011 | Botzas |
| 2011/0169798 A1 | 7/2011 | Lee |
| 2011/0175895 A1 | 7/2011 | Hayakawa |
| 2011/0181630 A1 | 7/2011 | Smith |
| 2011/0199395 A1 | 8/2011 | Nathan |
| 2011/0227964 A1* | 9/2011 | Chaji .................... G09G 3/006 345/690 |
| 2011/0242074 A1 | 10/2011 | Bert et al. |
| 2011/0273399 A1 | 11/2011 | Lee |
| 2011/0279488 A1 | 11/2011 | Nathan et al. |
| 2011/0292006 A1 | 12/2011 | Kim |
| 2011/0293480 A1 | 12/2011 | Mueller |
| 2012/0056558 A1 | 3/2012 | Toshiya |
| 2012/0062565 A1 | 3/2012 | Fuchs |
| 2012/0262184 A1 | 10/2012 | Shen |
| 2012/0299970 A1 | 11/2012 | Bae |
| 2012/0299978 A1 | 11/2012 | Chaji |
| 2013/0027381 A1 | 1/2013 | Nathan |
| 2013/0057595 A1 | 3/2013 | Nathan |
| 2013/0112960 A1 | 5/2013 | Chaji |
| 2013/0135272 A1 | 5/2013 | Park |
| 2013/0162617 A1 | 6/2013 | Yoon |
| 2013/0201223 A1 | 8/2013 | Li et al. |
| 2013/0241813 A1 | 9/2013 | Tanaka |
| 2013/0309821 A1 | 11/2013 | Yoo |
| 2013/0321671 A1 | 12/2013 | Cote |
| 2014/0015824 A1 | 1/2014 | Chaji et al. |
| 2014/0022289 A1 | 1/2014 | Lee |
| 2014/0043316 A1 | 2/2014 | Chaji et al. |
| 2014/0055500 A1* | 2/2014 | Lai .................... G09G 3/3208 345/690 |
| 2014/0111567 A1 | 4/2014 | Nathan et al. |
| 2016/0275860 A1 | 9/2016 | Wu |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 432 530 | 7/2002 |
| CA | 2 436 451 | 8/2002 |
| CA | 2 438 577 | 8/2002 |
| CA | 2 463 653 | 1/2004 |
| CA | 2 498 136 | 3/2004 |
| CA | 2 522 396 | 11/2004 |
| CA | 2 443 206 | 3/2005 |
| CA | 2 472 671 | 12/2005 |
| CA | 2 567 076 | 1/2006 |
| CA | 2526436 | 2/2006 |
| CA | 2 526 782 | 4/2006 |
| CA | 2 541 531 | 7/2006 |
| CA | 2 550 102 | 4/2008 |
| CA | 2 773 699 | 10/2013 |
| CN | 1381032 | 11/2002 |
| CN | 1448908 | 10/2003 |
| CN | 1682267 A | 10/2005 |
| CN | 1760945 | 4/2006 |
| CN | 1886774 | 12/2006 |
| CN | 101449311 | 6/2009 |
| CN | 102656621 | 9/2012 |
| EP | 0 158 366 | 10/1985 |
| EP | 1 028 471 | 8/2000 |
| EP | 1 111 577 | 6/2001 |
| EP | 1 130 565 A1 | 9/2001 |
| EP | 1 194 013 | 4/2002 |
| EP | 1 335 430 A1 | 8/2003 |
| EP | 1 372 136 | 12/2003 |
| EP | 1 381 019 | 1/2004 |

(56) References Cited

FOREIGN PATENT DOCUMENTS

| | | |
|---|---|---|
| EP | 1 418 566 | 5/2004 |
| EP | 1 429 312 A | 6/2004 |
| EP | 145 0341 A | 8/2004 |
| EP | 1 465 143 A | 10/2004 |
| EP | 1 469 448 A | 10/2004 |
| EP | 1 521 203 A2 | 4/2005 |
| EP | 1 594 347 | 11/2005 |
| EP | 1 784 055 A2 | 5/2007 |
| EP | 1854338 A1 | 11/2007 |
| EP | 1 879 169 A1 | 1/2008 |
| EP | 1 879 172 | 1/2008 |
| EP | 2395499 A1 | 12/2011 |
| GB | 2 389 951 | 12/2003 |
| JP | 1272298 | 10/1989 |
| JP | 4-042619 | 2/1992 |
| JP | 6-314977 | 11/1994 |
| JP | 8-340243 | 12/1996 |
| JP | 09-090405 | 4/1997 |
| JP | 10-254410 | 9/1998 |
| JP | 11-202295 | 7/1999 |
| JP | 11-219146 | 8/1999 |
| JP | 11 231805 | 8/1999 |
| JP | 11-282419 | 10/1999 |
| JP | 2000-056847 | 2/2000 |
| JP | 2000-81607 | 3/2000 |
| JP | 2001-134217 | 5/2001 |
| JP | 2001-195014 | 7/2001 |
| JP | 2002-055654 | 2/2002 |
| JP | 2002-91376 | 3/2002 |
| JP | 2002-514320 | 5/2002 |
| JP | 2002-229513 | 8/2002 |
| JP | 2002-278513 | 9/2002 |
| JP | 2002-333862 | 11/2002 |
| JP | 2003-076331 | 3/2003 |
| JP | 2003-124519 | 4/2003 |
| JP | 2003-177709 | 6/2003 |
| JP | 2003-271095 | 9/2003 |
| JP | 2003-308046 | 10/2003 |
| JP | 2003-317944 | 11/2003 |
| JP | 2004-004675 | 1/2004 |
| JP | 2004-045648 | 2/2004 |
| JP | 2004-145197 | 5/2004 |
| JP | 2004-287345 | 10/2004 |
| JP | 2005-057217 | 3/2005 |
| JP | 2007-065015 | 3/2007 |
| JP | 2007-155754 | 6/2007 |
| JP | 2008-102335 | 5/2008 |
| JP | 4-158570 | 10/2008 |
| JP | 2003-195813 | 7/2013 |
| KR | 2004-0100887 | 12/2004 |
| TW | 342486 | 10/1998 |
| TW | 473622 | 1/2002 |
| TW | 485337 | 5/2002 |
| TW | 502233 | 9/2002 |
| TW | 538650 | 6/2003 |
| TW | 1221268 | 9/2004 |
| TW | 1223092 | 11/2004 |
| TW | 200727247 | 7/2007 |
| WO | WO 98/48403 | 10/1998 |
| WO | WO 99/48079 | 9/1999 |
| WO | WO 01/06484 | 1/2001 |
| WO | WO 01/27910 A1 | 4/2001 |
| WO | WO 01/63587 A2 | 8/2001 |
| WO | WO 02/067327 A | 8/2002 |
| WO | WO 03/001496 A1 | 1/2003 |
| WO | WO 03/034389 A | 4/2003 |
| WO | WO 03/058594 A1 | 7/2003 |
| WO | WO 03/063124 | 7/2003 |
| WO | WO 03/077231 | 9/2003 |
| WO | WO 2004/003877 | 1/2004 |
| WO | WO 2004/025615 A | 3/2004 |
| WO | WO 2004/034364 | 4/2004 |
| WO | WO 2004/047058 | 6/2004 |
| WO | WO 2004/104975 A1 | 12/2004 |
| WO | WO 2005/022498 | 3/2005 |
| WO | WO 2005/022500 A | 3/2005 |
| WO | WO 2005/029455 | 3/2005 |
| WO | WO 2005/029456 | 3/2005 |
| WO | WO/2005/034072 A1 | 4/2005 |
| WO | WO 2005/055185 | 6/2005 |
| WO | WO 2006/000101 A1 | 1/2006 |
| WO | WO 2006/053424 | 5/2006 |
| WO | WO 2006/063448 A | 6/2006 |
| WO | WO 2006/084360 | 8/2006 |
| WO | WO 2007/003877 A | 1/2007 |
| WO | WO 2007/079572 | 7/2007 |
| WO | WO 2007/120849 A2 | 10/2007 |
| WO | WO 2009/048618 | 4/2009 |
| WO | WO 2009/055920 | 5/2009 |
| WO | WO 2010/023270 | 3/2010 |
| WO | WO 2010/146707 A1 | 12/2010 |
| WO | WO 2011/041224 A1 | 4/2011 |
| WO | WO 2011/064761 A1 | 6/2011 |
| WO | WO 2011/067729 | 6/2011 |
| WO | WO 2012/160424 A1 | 11/2012 |
| WO | WO 2012/160471 | 11/2012 |
| WO | WO 2012/164474 A2 | 12/2012 |
| WO | WO 2012/164475 A2 | 12/2012 |

OTHER PUBLICATIONS

Alexander : "Pixel circuits and drive schemes for glass and elastic AMOLED displays"; dated Jul. 2005 (9 pages).

Alexander : "Unique Electrical Measurement Technology for Compensation, Inspection, and Process Diagnostics of AMOLED HDTV"; dated May 2010 (4 pages).

Ashtiani : "AMOLED Pixel Circuit With Electronic Compensation of Luminance Degradation"; dated Mar. 2007 (4 pages).

Chaji : "A Current-Mode Comparator for Digital Calibration of Amorphous Silicon AMOLED Displays"; dated Jul. 2008 (5 pages).

Chaji : "A fast settling current driver based on the CCII for AMOLED displays"; dated Dec. 2009 (6 pages).

Chaji : "A Low-Cost Stable Amorphous Silicon AMOLED Display with Full V~T- and V~O~L~E~D Shift Compensation"; dated May 2007 (4 pages).

Chaji : "A low-power driving scheme for a-Si:H active-matrix organic light-emitting diode displays"; dated Jun. 2005 (4 pages).

Chaji : "A low-power high-performance digital circuit for deep submicron technologies"; dated Jun. 2005 (4 pages).

Chaji : "A novel a-Si:H AMOLED pixel circuit based on short-term stress stability of a-Si:H TFTs"; dated Oct. 2005 (3 pages).

Chaji : "A Novel Driving Scheme and Pixel Circuit for AMOLED Displays"; dated Jun. 2006 (4 pages).

Chaji : "A Novel Driving Scheme for High Resolution Large-area a-SI:H AMOLED displays"; dated Aug. 2005 (3 pages).

Chaji : "A Stable Voltage-Programmed Pixel Circuit for a-Si:H AMOLED Displays"; dated Dec. 2006 (12 pages).

Chaji : "A Sub-μA fast-settling current-programmed pixel circuit for AMOLED displays"; dated Sep. 2007.

Chaji : "An Enhanced and Simplified Optical Feedback Pixel Circuit for AMOLED Displays"; dated Oct. 2006.

Chaji : "Compensation technique for DC and transient instability of thin film transistor circuits for large-area devices"; dated Aug. 2008.

Chaji : "Driving scheme for stable operation of 2-TFT a-Si AMOLED pixel"; dated Apr. 2005 (2 pages).

Chaji : "Dynamic-effect compensating technique for stable a-Si:H AMOLED displays"; dated Aug. 2005 (4 pages).

Chaji : "Electrical Compensation of OLED Luminance Degradation"; dated Dec. 2007 (3 pages).

Chaji : "eUTDSP: a design study of a new VLIW-based DSP architecture"; dated My 2003 (4 pages).

Chaji : "Fast and Offset-Leakage Insensitive Current-Mode Line Driver for Active Matrix Displays and Sensors"; dated Feb. 2009 (8 pages).

Chaji : "High Speed Low Power Adder Design With a New Logic Style: Pseudo Dynamic Logic (SDL)"; dated Oct. 2001 (4 pages).

Chaji : "High-precision, fast current source for large-area current-programmed a-Si flat panels"; dated Sep. 2006 (4 pages).

(56) References Cited

OTHER PUBLICATIONS

Chaji : "Low-Cost AMOLED Television with IGNIS Compensating Technology"; dated May 2008 (4 pages).
Chaji : "Low-Cost Stable a-Si:H AMOLED Display for Portable Applications"; dated Jun. 2006 (4 pages).
Chaji : "Low-Power Low-Cost Voltage-Programmed a-Si:H AMOLED Display"; dated Jun. 2008 (5 pages).
Chaji : "Merged phototransistor pixel with enhanced near infrared response and flicker noise reduction for biomolecular imaging"; dated Nov. 2008 (3 pages).
Chaji : "Parallel Addressing Scheme for Voltage-Programmed Active-Matrix OLED Displays"; dated May 2007 (6 pages).
Chaji : "Pseudo dynamic logic (SDL): a high-speed and low-power dynamic logic family"; dated 2002 (4 pages).
Chaji : "Stable a-Si:H circuits based on short-term stress stability of amorphous silicon thin film transistors"; dated May 2006 (4 pages).
Chaji : "Stable Pixel Circuit for Small-Area High- Resolution a-Si:H AMOLED Displays"; dated Oct. 2008 (6 pages).
Chaji : "Stable RGBW AMOLED display with OLED degradation compensation using electrical feedback"; dated Feb. 2010 (2 pages).
Chaji : "Thin-Film Transistor Integration for Biomedical Imaging and AMOLED Displays"; dated 2008 (177 pages).
European Search Report for Application No. EP 04 78 6661 dated Mar. 9, 2009.
European Search Report for Application No. EP 05 75 9141 dated Oct. 30, 2009 (2 pages).
European Search Report for Application No. EP 05 81 9617 dated Jan. 30, 2009.
European Search Report for Application No. EP 06 70 5133 dated Jul. 18, 2008.
European Search Report for Application No. EP 06 72 1798 dated Nov. 12, 2009 (2 pages).
European Search Report for Application No. EP 07 71 0608.6 dated Mar. 19, 2010 (7 pages).
European Search Report for Application No. EP 07 71 9579 dated May 20, 2009.
European Search Report for Application No. EP 07 81 5784 dated Jul. 20, 2010 (2 pages).
European Search Report for Application No. EP 10 16 6143, dated Sep. 3, 2010 (2 pages).
European Search Report for Application No. EP 10 83 4294.0-1903, dated Apr. 8, 2013, (9 pages).
European Supplementary Search Report for Application No. EP 04 78 6662 dated Jan. 19, 2007 (2 pages).
Extended European Search Report for Application No. 11 73 9485.8 dated Aug. 6, 2013 (14 pages).
Extended European Search Report for Application No. EP 09 73 3076.5, dated Apr. 27, (13 pages).
Extended European Search Report for Application No. EP 11 16 8677.0, dated Nov. 29, 2012, (13 page).
Extended European Search Report for Application No. EP 11 19 1641.7 dated Jul. 11, 2012 (14 pages).
Extended European Search Report for Application No. EP 10834297 dated Oct. 27, 2014 (6 pages).
Fossum, Eric R.. "Active Pixel Sensors: Are CCD's Dinosaurs?" SPIE: Symposium on Electronic Imaging. Feb. 1, 1993 (13 pages).
Goh , "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
International Preliminary Report on Patentability for Application No. PCT/CA2005/001007 dated Oct. 16, 2006, 4 pages.
International Search Report for Application No. PCT/CA2004/001741 dated Feb. 21, 2005.
International Search Report for Application No. PCT/CA2004/001742, Canadian Patent Office, dated Feb. 21, 2005 (2 pages).
International Search Report for Application No. PCT/CA2005/001007 dated Oct. 18, 2005.
International Search Report for Application No. PCT/CA2005/001897, dated Mar. 21, 2006 (2 pages).
International Search Report for Application No. PCT/CA2007/000652 dated Jul. 25, 2007.
International Search Report for Application No. PCT/CA2009/000501, dated Jul. 30, 2009 (4 pages).
International Search Report for Application No. PCT/CA2009/001769, dated Apr. 8, 2010 (3 pages).
International Search Report for Application No. PCT/IB2010/055481, dated Apr. 7, 2011, 3 pages.
International Search Report for Application No. PCT/IB2010/055486, dated Apr. 19, 2011, 5 pages.
International Search Report for Application No. PCT/IB2014/060959, dated Aug. 28, 2014, 5 pages.
International Search Report for Application No. PCT/IB2010/055541 filed Dec. 1, 2010, dated May 26, 2011; 5 pages.
International Search Report for Application No. PCT/IB2011/050502, dated Jun. 27, 2011 (6 pages).
International Search Report for Application No. PCT/IB2011/051103, dated Jul. 8, 2011, 3 pages.
International Search Report for Application No. PCT/IB2011/055135, Canadian Patent Office, dated Apr. 16, 2012 (5 pages).
International Search Report for Application No. PCT/IB2012/052372, dated Sep. 12, 2012 (3 pages).
International Search Report for Application No. PCT/IB2013/054251, Canadian Intellectual Property Office, dated Sep. 11, 2013; (4 pages).
International Search Report for Application No. PCT/JP02/09668, dated Dec. 3, 2002, (4 pages).
International Written Opinion for Application No. PCT/CA2004/001742, Canadian Patent Office, dated Feb. 21, 2005 (5 pages).
International Written Opinion for Application No. PCT/CA2005/001897, dated Mar. 21, 2006 (4 pages).
International Written Opinion for Application No. PCT/CA2009/000501 dated Jul. 30, 2009 (6 pages).
International Written Opinion for Application No. PCT/IB2010/055481, dated Apr. 7, 2011, 6 pages.
International Written Opinion for Application No. PCT/IB2010/055486, dated Apr. 19, 2011, 8 pages.
International Written Opinion for Application No. PCT/IB2010/055541, dated May 26, 2011; 6 pages.
International Written Opinion for Application No. PCT/IB2011/050502, dated Jun. 27, 2011 (7 pages).
International Written Opinion for Application No. PCT/IB2011/051103, dated Jul. 8, 2011, 6 pages.
International Written Opinion for Application No. PCT/IB2011/055135, Canadian Patent Office, dated Apr. 16, 2012 (5 pages).
International Written Opinion for Application No. PCT/IB2012/052372, dated Sep. 12, 2012 (6 pages).
International Written Opinion for Application No. PCT/IB2013/054251, Canadian Intellectual Property Office, dated Sep. 11, 2013; (5 pages).
Jafarabadiashtiani : "A New Driving Method for a-Si AMOLED Displays Based on Voltage Feedback"; dated 2005 (4 pages).
Kanicki, J., "Amorphous Silicon Thin-Film Transistors Based Active-Matrix Organic Light-Emitting Displays." Asia Display: International Display Workshops, Sep. 2001 (pp. 315-318).
Karim, K. S., "Amorphous Silicon Active Pixel Sensor Readout Circuit for Digital Imaging." IEEE: Transactions on Electron Devices. vol. 50, No. 1, Jan. 2003 (pp. 200-208).
Lee : "Ambipolar Thin-Film Transistors Fabricated by PECVD Nanocrystalline Silicon"; dated 2006.
Lee, Wonbok: "Thermal Management in Microprocessor Chips and Dynamic Backlight Control in Liquid Crystal Displays", Ph.D. Dissertation, University of Southern California (124 pages).
Liu, P. et al., Innovative Voltage Driving Pixel Circuit Using Organic Thin-Film Transistor for AMOLEDs, Journal of Display Technology, vol. 5, Issue 6, Jun. 2009 (pp. 224-227).
Ma E Y: "organic light emitting diode/thin film transistor integration for foldable displays" dated Sep. 15, 1997(4 pages).
Matsueda y : "35.1: 2.5-in. AMOLED with Integrated 6-bit Gamma Compensated Digital Data Driver"; dated May 2004.
Mendes E., "A High Resolution Switch-Current Memory Base Cell." IEEE: Circuits and Systems. vol. 2, Aug. 1999 (pp. 718-721).

(56) References Cited

OTHER PUBLICATIONS

Nathan A. , "Thin Film imaging technology on glass and plastic" ICM 2000, proceedings of the 12 international conference on microelectronics, dated Oct. 31, 2001 (4 pages).

Nathan , "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.

Nathan : "Backplane Requirements for active Matrix Organic Light Emitting Diode Displays,"; dated 2006 (16 pages).

Nathan : "Call for papers second international workshop on compact thin-film transistor (TFT) modeling for circuit simulation"; dated Sep. 2009 (1 page).

Nathan : "Driving schemes for a-Si and LTPS AMOLED displays"; dated Dec. 2005 (11 pages).

Nathan : "Invited Paper: a-Si for AMOLED—Meeting the Performance and Cost Demands of Display Applications (Cell Phone to HDTV)"; dated 2006 (4 pages).

Office Action in Japanese patent application No. JP2012-541612 dated Jul. 15, 2014. (3 pages).

Partial European Search Report for Application No. EP 11 168 677.0, dated Sep. 22, 2011 (5 pages).

Partial European Search Report for Application No. EP 11 19 1641.7, dated Mar. 20, 2012 (8 pages).

Philipp: "Charge transfer sensing" Sensor Review, vol. 19, No. 2, Dec. 31, 1999 (Dec. 31, 1999), 10 pages.

Rafati : "Comparison of a 17 b multiplier in Dual-rail domino and in Dual-rail D L (D L) logic styles"; dated 2002 (4 pages).

Safavian : "3-TFT active pixel sensor with correlated double sampling readout circuit for real-time medical x-ray imaging"; dated Jun. 2006 (4 pages).

Safavian : "A novel current scaling active pixel sensor with correlated double sampling readout circuit for real time medical x-ray imaging"; dated May 2007 (7 pages).

Safavian : "A novel hybrid active-passive pixel with correlated double sampling CMOS readout circuit for medical x-ray imaging"; dated May 2008 (4 pages).

Safavian : "Self-compensated a-Si:H detector with current-mode readout circuit for digital X-ray fluoroscopy"; dated Aug. 2005 (4 pages).

Safavian : "TFT active image sensor with current-mode readout circuit for digital x-ray fluoroscopy [5969D-82]"; dated Sep. 2005 (9 pages).

Safavian : "Three-TFT image sensor for real-time digital X-ray imaging"; dated Feb. 2, 2006 (2 pages).

Singh "Current Conveyor: Novel Universal Active Block", Samridhi, S-JPSET vol. I, Issue 1, 2010, pp. 41-48.

Smith, Lindsay I., "A tutorial on Principal Components Analysis," dated Feb. 26, 2001 (27 pages).

Spindler , System Considerations for RGBW OLED Displays, Journal of the SID 14/1, 2006, pp. 37-48.

Stewart M. , "polysilicon TFT technology for active matrix oled displays" IEEE transactions on electron devices, vol. 48, No. 5, dated May 2001 (7 pages).

Vygranenko : "Stability of indium-oxide thin-film transistors by reactive ion beam assisted deposition"; dated 2009.

Wang : "Indium oxides by reactive ion beam assisted evaporation: From material study to device application"; dated Mar. 2009 (6 pages).

Yi He , "Current-Source a-Si:H Thin Film Transistor Circuit for Active-Matrix Organic Light-Emitting Displays", IEEE Electron Device Letters, vol. 21, No. 12, Dec. 2000, pp. 590-592.

Yu, Jennifer: "Improve OLED Technology for Display", Ph.D. Dissertation, Massachusetts Institute of Technology, Sep. 2008 (151 pages).

International Search Report for Application No. PCT/IB2014/058244, Canadian Intellectual Property Office, dated Apr. 11, 2014; (6 pages).

International Search Report for Application No. PCT/IB2014/059753, Canadian Intellectual Property Office, dated Jun. 23, 2014; (6 pages).

Written Opinion for Application No. PCT/IB2014/059753, Canadian Intellectual Property Office, dated Jun. 12, 2014 (6 pages).

International Search Report for Application No. PCT/IB2014/060879, Canadian Intellectual Property Office, dated Jul. 17, 2014 (3 pages).

Extended European Search Report for Application No. EP 14158051.4, dated Jul. 29, 2014, (4 pages).

Office Action in Chinese Patent Invention No. 201180008188.9, dated Jun. 4, 2014 (17 pages) (w/English translation).

International Search Report for Application No. PCT/IB/2014/066932 dated Mar. 24, 2015.

Written Opinion for Application No. PCT/IB/2014/066932 dated Mar. 24, 2015.

Extended European Search Report for Application No. EP 11866291.5, dated Mar. 9, 2015, (9 pages).

Extended European Search Report for Application No. EP 14181848.4, dated Mar. 5, 2015, (8 pages).

Office Action in Chinese Patent Invention No. 201280022957.5, dated Jun. 26, 2015 (7 pages).

Extended European Search Report for Application No. EP 13794695.0, dated Dec. 18, 2015, (9 pages).

Extended European Search Report for Application No. EP 16157746.5, dated Apr. 8, 2016, (11 pages).

Extended European Search Report for Application No. EP 16192749.6, dated Dec. 15, 2016, (17 pages).

International Search Report for Application No. PCT/IB/2016/054763 dated Nov. 25, 2016 (4 pages).

Written Opinion for Application No. PCT/IB/2016/054763 dated Nov. 25, 2016 (9 pages).

\* cited by examiner (B) Initial measurement with rate 1/4 × 1/4 and linear interpolation Average RMS error percentage = 3.9323%

(D) Final linear interpolation based on 19.01% measurement of all pixels in average Average RMS error percentage = 2.6533%

(A) Sample original image (C) Expanded detected edges by canny method

RE-INTERPOLATION WITH EDGE DETECTION FOR EXTRACTING AN AGING PATTERN FOR AMOLED DISPLAYS

CROSS REFERENCE TO RELATED APPLICATION

This application is a continuation of U.S. patent application Ser. No. 15/050,700, filed Feb. 23, 2016, now allowed, which is a continuation of U.S. patent application Ser. No. 14/209,392, filed Mar. 13, 2014, now U.S. Pat. No. 9,305,488, which claims the benefit of U.S. Provisional Patent Application No. 61/783,537, filed Mar. 14, 2013, entitled "Re-Interpolation with Edge Detection for Extracting an Aging Pattern for Amoled Displays" both of which are hereby incorporated by reference in their entireties.

FIELD OF THE INVENTION

The present disclosure generally relates to circuits for use in displays, and methods of estimating or extracting aging patterns of displays, particularly displays such as active matrix organic light emitting diode displays.

BACKGROUND

Displays can be created from an array of light emitting devices each controlled by individual circuits (i.e., pixel circuits) having transistors for selectively controlling the circuits to be programmed with display information and to emit light according to the display information. Thin film transistors ("TFTs") fabricated on a substrate can be incorporated into such displays. TFTs tend to demonstrate non-uniform behavior across display panels and over time as the displays age. Compensation techniques can be applied to such displays to achieve image uniformity across the displays and to account for degradation in the displays as the displays age.

Consider an active matrix organic light-emitting device (AMOLED) display with $N_R$ rows and $N_C$ columns of pixels. Let Matrix X of size $N_R \times N_C$ represent the $V_T$ shift or the mobility index of the pixels across the screen. The problem is to estimate Matrix X with the minimum number of pixel measurement. Matrix X is used to adjust the input voltage of each individual pixel (compensation) to have a uniform intensity for all pixels of the screen.

There is a need to minimize the number of measurements to reduce the time interval required for non-uniformity compensation. This saving in time further allows repeating the same measurement multiple times to reduce the variance of the additive noise by averaging.

SUMMARY

The foregoing and additional aspects and embodiments of the present disclosure will be apparent to those of ordinary skill in the art in view of the detailed description of various embodiments and/or aspects, which is made with reference to the drawings, a brief description of which is provided next.

According to an aspect of the present disclosure, a method of identifying on a display having pixels that are aging due to shifts in one or more aging characteristics of a current-driven component in each of the pixels, comprising the acts of: measuring, using a measurement circuit, an aging characteristic of some but not all pixels in a first region of the display using a down-sampling rate of $K_V \times K_H$, such that the aging characteristic of at least every $K_V$th pixel is measured along a column of the first region and the aging characteristic of at least every $K_H$th pixel is measured along a row of the first region, to produce a set of initial pixel measurements. In an aspect, the first region covers almost all of the pixels on the display except for a few rows at the bottom and a few columns on the right side of the display. In another aspect, the first region covers all of the pixels of the display. $K_V$ and $K_H$ are positive integers that are identical or mutually distinct. The method further includes: interpolating the set of initial pixel measurements to produce an initial aging pattern for the first region; storing, in a memory device, the initial aging pattern; locating in the initial aging pattern using an edge detection algorithm an edge corresponding to a discontinuity in pixel intensity; measuring, using the measurement circuit, the aging characteristic of those of the pixels along the located edge in the initial aging pattern that were not measured in the first region to produce a set of edge measurements; applying a scattered interpolation algorithm using the set of initial pixel measurements and the set of edge measurements to produce a refined aging pattern of the first region; and storing an indication of the refined aging pattern in the memory device.

The method can further include measuring, using the measurement circuit, the aging characteristic of every $K_H$th pixel located in the last row of the display and of every $K_V$th pixel located in the last column of the display to include with the set of initial pixel measurements.

The method can further include, if the aging characteristic of the pixel located in the last column and in the last row of the display has not been measured so as to appear in the set of initial pixel measurements, measuring, using the measurement circuit, the aging characteristic of the pixel located in the last column and in the last row of the display to include with the set of initial pixel measurements.

The method can further include: further measuring, using the measurement circuit, the aging characteristic of at least some of the $K_H$ pixels horizontally and at least some of the $K_V$ pixels vertically from the located edge in the first region to produce a set of additional edge measurements; and adding the set of additional edge measurements to the set of edge measurements. The applying the scattered interpolation algorithm can be further based on the set of additional edge measurements.

The further measuring can include measuring the aging characteristic of at least every unmeasured pixel defined by a block having a size of at least $(K_H+1)(K_V+1)$, starting at an initial pixel along the located edge and including these further measured pixels in the set of additional edge measurements.

The further measuring can include measuring the aging characteristic of at least every one of the next $K_H$ unmeasured pixels located on the same row following the adjacent initial pixel along the located edge and of at least every one of the next $K_V$ unmeasured pixels located on the same column following the adjacent initial pixel and including these further measured pixels in the set of additional edge measurements.

The method can further include stopping the further measuring when an already measured pixel from the set of initial pixel measurements is encountered along the row or the column of the initial pixel.

The indication of the refined aging pattern can be an estimation matrix corresponding to the pixel resolution of the display, wherein the pixel resolution corresponds to a number $N_R$ of rows and a number $N_C$ of columns of pixels forming the display.

Each value in the estimation matrix can correspond to an amount by which the pixel corresponding to the row and the column where the value appears in the matrix is aging such that a compensation value is applied to increase a programmed brightness for the pixel to compensate for the aging amount.

The aging characteristic can be related to a shift in a threshold voltage of a drive transistor that drives a light emitting device in each of the pixels, or a change in a voltage across the light emitting device in each of the pixels, or a change in a drive current of the drive transistor needed to cause the light emitting device in each of the pixels to emit a programmed brightness, or a change in a current of the light emitting device needed to emit a programmed brightness.

Each of the pixels can include a light emitting device and a drive transistor that drives the light emitting device with a current corresponding to a programmed brightness emitted by the light emitting device.

The first region can span the entire display or nearly all of the entire display. When the first region spans most but not the entire display, there can be one to three additional disjoint regions that together with the first region span the entire display. For example, a second region can include a thin vertical region comprising the first few columns on the right side of the display. A third region can include the bottom few rows on the bottom of the display. A fourth region can include a small rectangular region comprising a few pixels on the bottom right hand side of the display. Depending on the size of the display, $N_R \times N_C$, and the down-sampling rate, $K_H \times K_V$, there may be only one region (a first region), or one to three additional regions.

The interpolating the set of initial pixel measurements can estimate aging values of pixels that were not measured in the first region due to the down-sampling rate.

The edge detection algorithm can be a Canny edge detection algorithm.

$K_V$ can be 2 or 4 or any other positive integer, and $K_H$ can be 2, 3, or 4 or any other positive integer.

No more than 50% of all the pixels in the display can be measured to produce the initial aging pattern, or no more than 25% of all the pixels in the display can be measured to produce the initial aging pattern. The number of pixels that are initially measured depends on the down-sampling rate. For example, if $K_V=K_H=2$, almost 25% of all the pixels in the display are initially measured. As another example, if $K_V=K_H=4$, only 1/16 of all the pixels are initially measured.

The method can further include: measuring, using the measurement circuit, the aging characteristic of some but not all pixels in a second region of the display, to include with the set of initial pixel measurements, the first region and the second region being disjoint, wherein the interpolating produces the initial aging pattern for the first region and the second region. The edge detection algorithm is run on the entire display to locate edges

BRIEF DESCRIPTION OF THE DRAWINGS

The foregoing and other advantages of the disclosure will become apparent upon reading the following detailed description and upon reference to the drawings.

Figure 1:
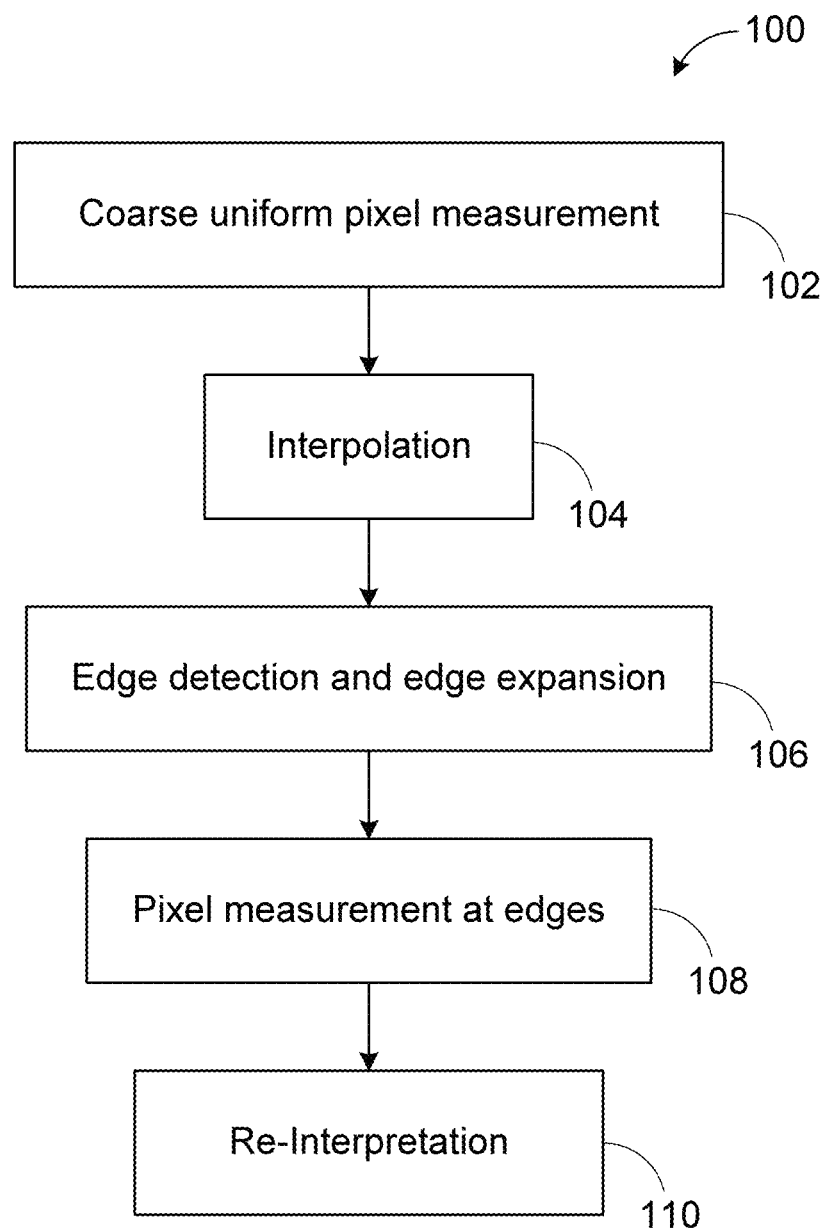
FIG. 1 shows a block diagram of the algorithm according to an aspect of the present disclosure.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

While particular embodiments and applications of the present disclosure have been illustrated and described, it is to be understood that the disclosure is not limited to the precise construction and compositions disclosed herein and that various modifications, changes, and variations can be apparent from the foregoing descriptions without departing from the spirit and scope of the invention as defined in the appended claims.

The aging pattern of a screen or display is highly spatially correlated. For displays having low correlated or uncorrelated aging patterns, most or even all of the pixels need to be measured to ascertain their aging characteristic. However, due to high spatial correlation, the aging pattern of the display can be estimated from measuring a proper subset of all pixels in the display. The present disclosure presents a class of approaches that are based on pixel measurement. An algorithm which is easy to implement and works based on measuring a non-uniform subset of pixels to estimate the aging pattern of the display is presented.

Referring to FIG. 1, an algorithm starts with an initial uniform (by uniform, it is meant that a regular or uniform pattern of pixels are measured) measurement of a characteristic (e.g., aging) of the pixels with a specific down-sampling rate $K_V \times K_H$, such as for example 4×4, which means that the aging characteristic of the pixel in every $4^{th}$ row and every 4th column is measured while other pixels in each 4×4 block of pixels are not measured in this initial uniform measurement of the algorithm 100 (102). Assuming a high spatial correlation, a coarse aging pattern of the entire display (including non-measured pixels) is obtained by interpolating the measured data (104). Most of the error due to interpolation can happen at or near the vicinity of the edges where image brightness levels change abruptly. Accordingly, an edge detection algorithm is run to detect the edges where sudden brightness levels occur (106). Then, the aging pattern is further refined by making extra pixel measurements at or around the detected edges (108) and then re-interpolating the measured aging data across the entire display (110).

An initial pixel measurement is performed with the down-sampling rate of $K_V \times K_H$. Starting from a corner of the display (e.g., the upper-left corner) with the coordinate (0,0), the pixels located at integer multiples (e.g., 4) of the vertical and horizontal parameters of the down-sampling rate are measured. Depending on the size of the display and the selected down-sampling rate, a few last rows ($n_r < K_V$) and a few last columns ($n_c < K_H$) of the pixels may not be measured during this initial pixel measurement using the selected down-sampling rate. Prior to interpolating for all the pixels of the display, aging characteristics of the pixels at the very last row and the very last column of the display are measured with the same down-sampling rates $K_H$ and $K_V$, respectively. The pixel at the location corresponding to the bottom right of the display ($N_r$, $N_c$) can also be measured as part of the initial measurement. The aging characteristics of the measured pixels are stored as a set of initial pixel measurements in a memory device. The parameters of the down-sampling rate, $K_V$ and $K_H$, are integers and can be identical (e.g., 2×2 or 4×4) or mutually distinct (e.g., 2×4).

Depending on the size of the display and the selected down-sampling rate $K_V \times K_H$, the display can be (at most) divided to four disjoint (distinct) regions to which the initial uniform measurement is applied. This is due to the fact that the coordinates of the last row and the last column of pixels may not be integer factors of the selected down-sampling rate, and, so they can be measured separately. If the measurement is started from the upper-left corner of the screen, for example, these regions are located at the upper left, lower left, upper right, and the lower right parts of the display, respectively. In each region, a grided interpolation algorithm is run to estimate the unknown entries of the matrix X, which again has a size corresponding to the pixel resolution of the display and where the known entries correspond to the measured characteristics, and the unknown entries are interpolated.

Various conventional methods of interpolation such as "nearest neighbor," "linear," "cubic," or "spline" can be used. In case that cubic or spline interpolation methods are deployed, the interpolated data in region 1 can be used to provide extra data needed to complete interpolation in regions 2 and 3. Similarly, the interpolated data in regions 1, 2, and 3 can be used to complete the interpolation in region 4. Alternatively, the pixels required for interpolation at regions 2, 3, 4 can be directly measured.

Because edges happen due to abrupt changes in the intensity or brightness of surrounding pixels, they can result in local maximums in the gradient magnitude of the image. This phenomenon allows detection of the edges using image signal processing by finding the local maximums of the gradient of the image. Conventional edge detection algorithms such as "sobel," "prewitt," "log," and "roberts" work according to this principle, and are suitable for use in detecting the local maximums of the image gradient.

A more advanced edge detection algorithm which works based on finding and tracking the local maximums of the gradient is a "canny" edge detector which was developed by John F. Canny in 1986. The canny edge detector can be used herein due to its precise detection and location of connected edges and accordingly more precise recognition of different aged areas of the display.

The output of the canny edge detector is a binary matrix with the same size of the original image (i.e., the same size as matrix X) in which the edge entries (e.g., local maxima) are marked by a binary value of one and the rest of the entries in the binary matrix are zero.

Assuming that the canny edge detector finds the location of the edges precisely, the location of each edge can still have an error of at most $K_V \times K_H$ pixels due to the down-sampling resolution of the initial interpolation. Three different approaches can be used to reduce the error.

A coarse or "brute force" approach is to measure all $(K_V+1) \times (K_H+1)$ pixels between the four initial measurements around the detected edge. When the edge is placed on an initially measured pixel, the $(K_V+1) \times (K_H+1)$ pixels horizontally on the right and vertically below the current pixel (starting from the edge pixel itself) are measured. For example if $K_V = K_H = 4$, there are 25 pixels around the edge pixel that need to be measured. Because four of them have already been measured during the initial measurement (and are already in the set of initial pixel measurements), a total of at most 21 pixels around the detected edge pixel are measured. However, this approach can result in too many new pixels being measured without a material reduction of error.

To reduce the number of additional measurements, another approach measures a total of $(K_H+1)$ horizontal and $(K_V+1)$ vertical pixels around the detected edge and between the coordinates of the adjacent initially measured pixels. When the edge is placed on an initially measured pixel, the $(K_H+1)$ horizontal and the $(K_V+1)$ vertical pixels on the right of the edge pixel and below the edge pixel (including itself) is measured. Assuming $K_H = K_V = 4$, a total of at most 10 pixels around the edge pixel are measured using this approach.

To further reduce the number of additional measurements, yet another approach measures a total of at most $(K_H+1)$ pixels on the right of the edge pixel and a total of at most $(K_V+1)$ vertical pixels below and including the edge pixel. The measurement can be stopped when the coordinates of a next initially measured pixel are reached. In this approach, at most (Kh+1) pixels horizontally and $(K_V+1)$ pixels vertically are measured.

Note that in all the above approaches, the new pixels that are measured can overlap with previously measured pixels due to the initial measurement or due to the extra measurement for other pixels at edges. These new pixels are skipped as they have already been measured. The additional pixels that are measured following the initial interpolation produce a set of edge measurements.

The new set of measured data now includes the initial pixel measurements (set of initial pixel measurements) plus the new measurements at the edges and their vicinity (set of edge measurements). This new data set is not a grided set of data because the edges do not necessarily follow a grided pattern. Thus, a scattered data interpolation technique is used to interpolate this new data set having an irregular or non-grid pattern of measured data. The re-interpolation using a scattered data interpolation results in a more accurate estimation of the aging pattern with less error compared to the initial interpolation alone.

The performance of the algorithm is evaluated for both simulated and real data of an AMOLED display. The normalized root mean square (RMS) error percentage is considered as the performance criterion. If X and $\hat{X}$ are respectively the original and the estimated matrices, the normalized error can be defined as:

$$E \triangleq \frac{norm(X - \hat{X})}{norm(X)} \times 100$$

It is assumed that the average value of the entries of matrix X is zero, otherwise it is taken off from every single entry of the matrix X. This is necessary to highlight the estimation error. Otherwise, the more is the average value, the less is the estimation error.

Figure 2:
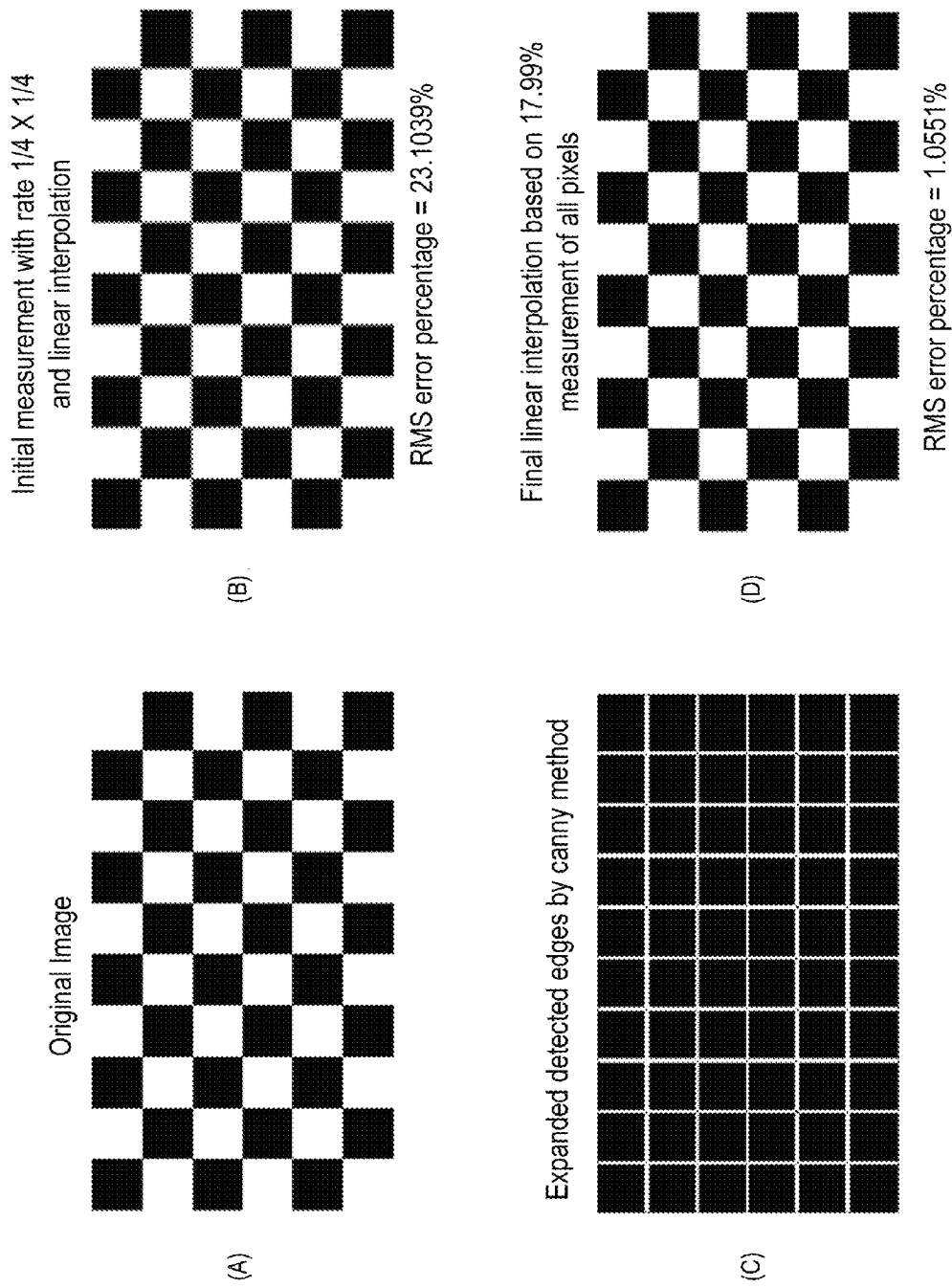
FIG. 2 shows results of simulated chess aging patterns of size 6×10

Four different simulated aging patterns respectively called "chess," "random intensity chess," "diamond," and "random intensity diamond" can be considered. The goal is twofold at this stage: 1) to determine a minimum number of measurements for a fixed pattern to achieve a reasonable estimation error, and 2) to observe the minimum size of the aged areas on the display in which the algorithm still shows a desirable performance. The simulated patterns can be added to a background of real data acquired from an AMOLED display. The performance of the algorithm is also evaluated in this case FIG. 2(A) shows a simulated chess aging pattern having a size 6×10 (black and white blocks) across a display having a size of 384×648 pixels. The size of each block in this example is 64×64 pixels. The initial pixel measurement is performed with the down-sampling rate of 4×4. FIG. 2(B) shows an image obtained by a linear interpolation of the measured data using the down-sampling rate. The normalized RMS estimation error is 23.1039%. FIG. 2(C) shows the edges detected by a canny edge detector. Note that the edges can be expanded as explained before to cover their vicinity. FIG. 2(D) illustrates the re-interpolated image in which new data at and/or near the detected edges are taken into account. The normalized RMS error improves to 1.0551% but at a cost of measuring 17.99% of all the pixels on the display.

In another example, the initial pixel measurement is performed with the down-sampling rate of 2×3. In this example, more than 16.6% of all pixels are measured uniformly. This value is comparable with the obtained from the previous example as the total percentage of the pixel measurements, 17.99% value. The initial interpolation in this example results in a normalized RMS error of 14.9986%. This indicates that the algorithm results in more than a 13% improvement in the normalized RMS error compared to the case in which almost the same number of pixels is measured uniformly across the display.

Figure 3:
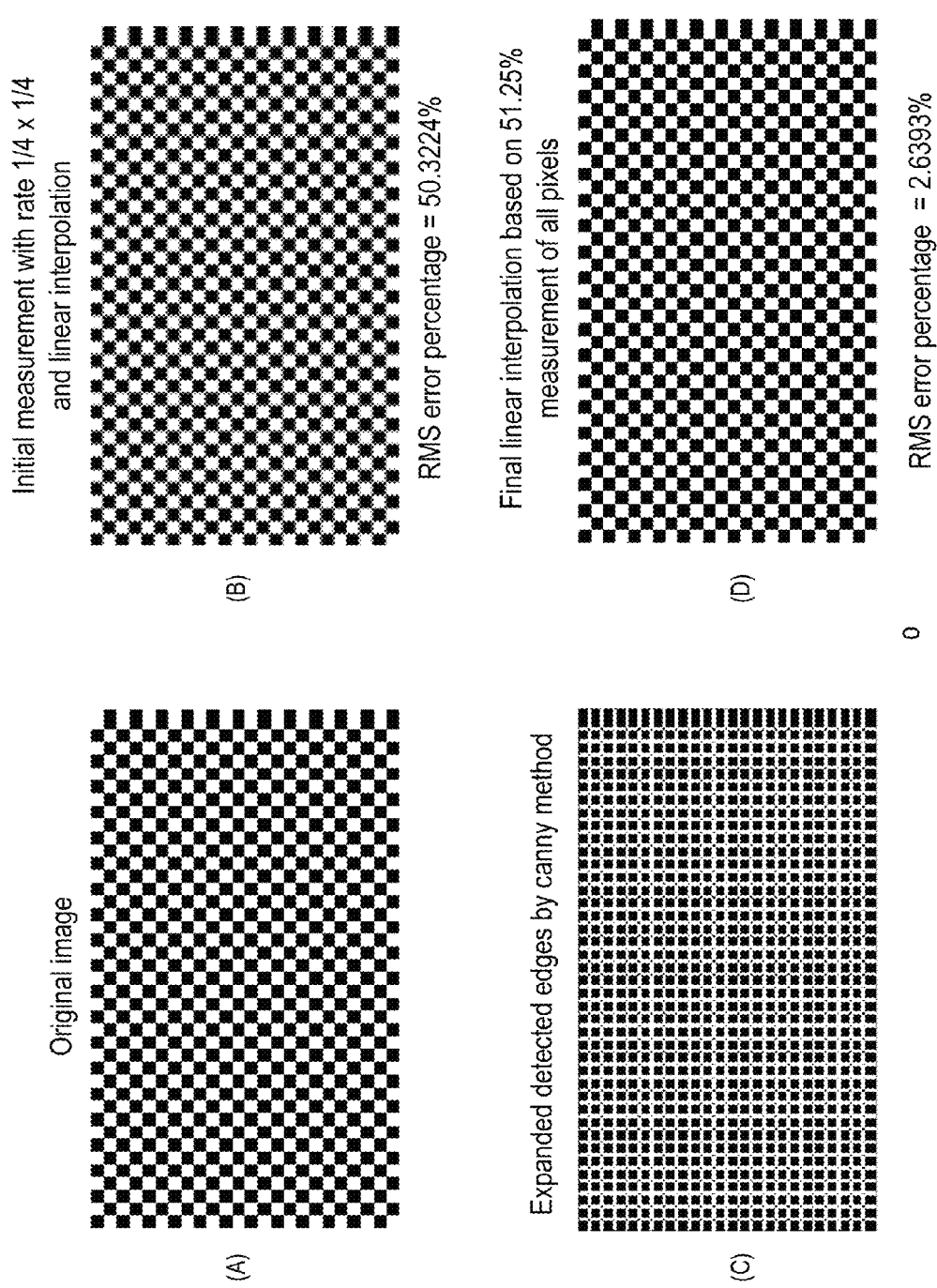
FIG. 3 shows results of simulated chess aging patterns of size 24×40

FIG. 3 shows the results of the same simulation with a chess aging pattern of size 24×40. In this example, the size of each block is 16×16 pixels. Notice that the RMS error percentage after the initial interpolation is 50.3224%. It improves to 2.1963% following Canny edge detection and re-interpolation. This gain is achieved at a cost of measuring 51.26% of all pixels. Consistent with the previous simulation, it is seen that if the initial down-sampling rate were chosen as 2×1, i.e., when more than half of the pixels are measured uniformly, the RMS error percentage improves to 24.5427%. This translates to achieving more than a 22% performance improvement, which is due to an intelligent choice of pixels that are measured. As can be seen, the algorithm performs very well even for a very small size of aged areas (e.g., as small as 16×16 pixels).

Figure 4:
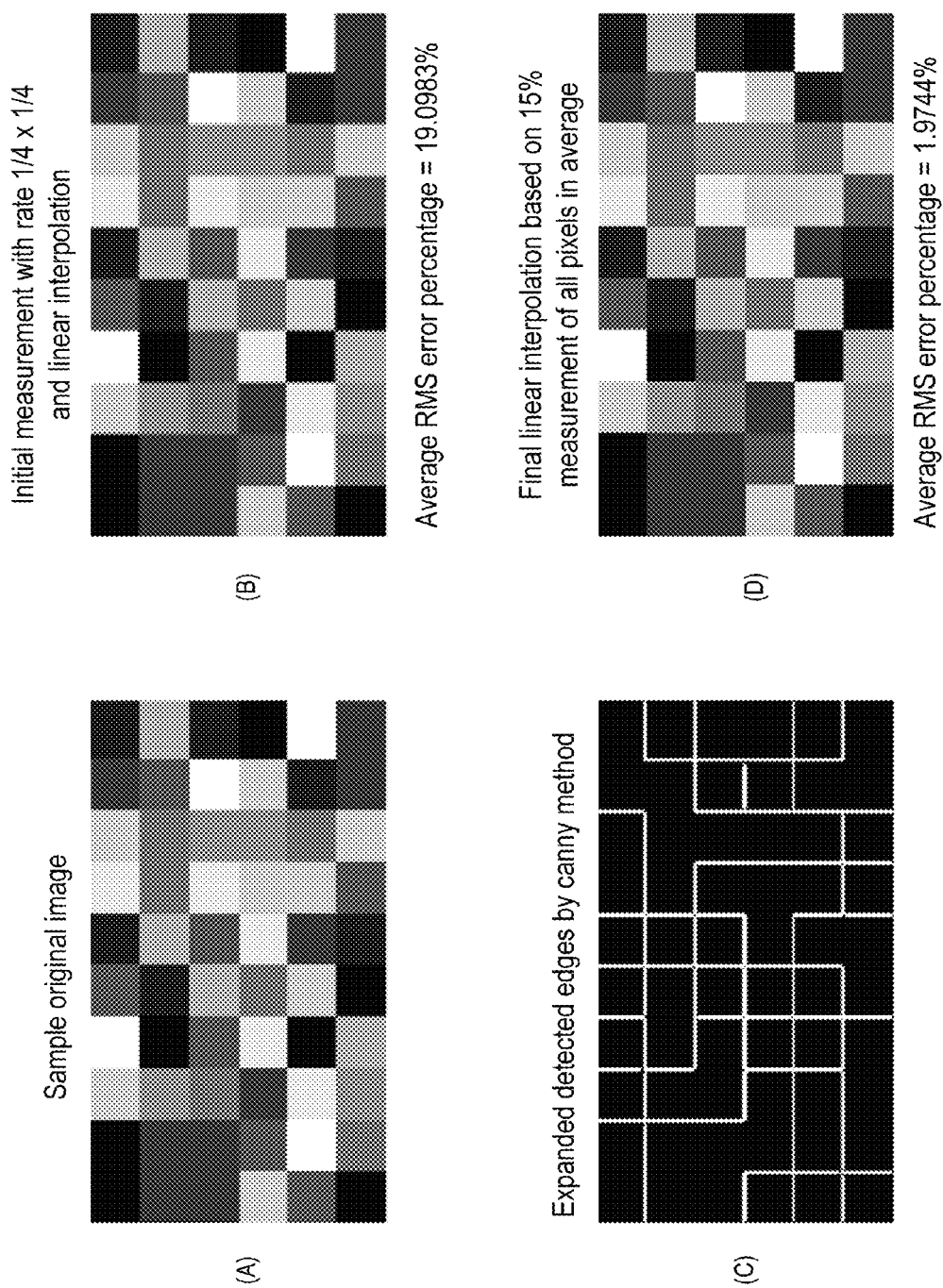
FIG. 4 illustrates the performance of the algorithm for a random intensity chess pattern of size 6×10 blocks.

In random intensity chess pattern each of the blocks chooses a random intensity level from the set {0, 0.1, 0.2, . . . , 1}. FIG. 4 illustrates the performance of the algorithm for an instant of this pattern of size 6×10 blocks. The simulation procedure is the same as that of the chess pattern. Note that the average RMS error and the average percentage of the total pixel measurement have been shown on the figure. These values were obtained based on 50 independent runs of the algorithm. As can be seen, the final average estimation error is 1.9744%, which is obtained at the cost of 15% average measurement of all pixels. In contrast, if the original image is sampled with the down-sampling rate of 2×3 and is linearly interpolated, the average RMS error equal to 12.29% is achieved. Thus, the algorithm provides more than 10% gain in average compared to a uniform measurement of pixels.

Figure 5:
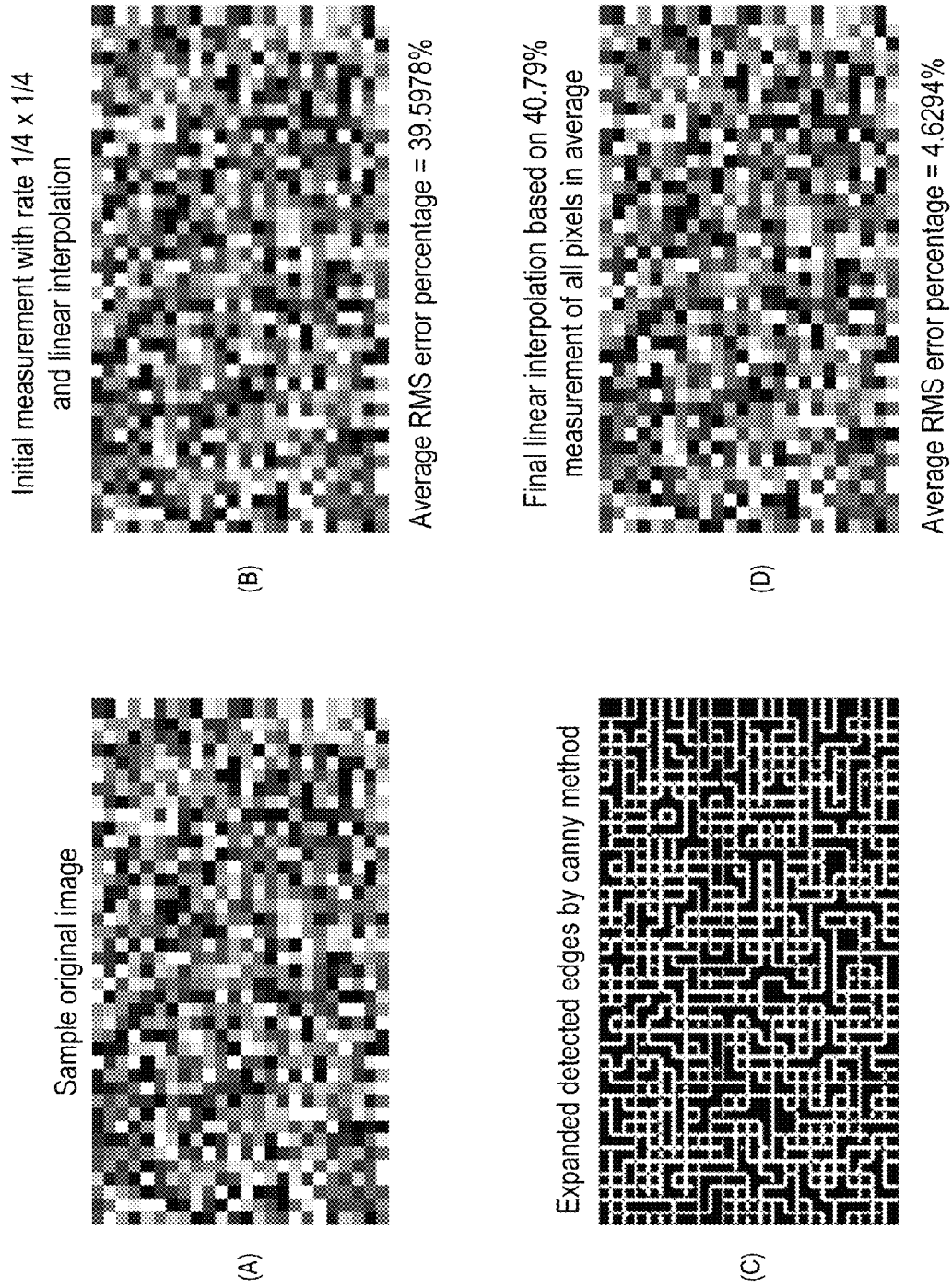
FIG. 5 illustrates the results of the same simulation when the random intensity chess pattern of size 24×40 is considered.

FIG. 5 illustrates the results of the same simulation when a random intensity chess pattern of size 24×40 is considered. The final average RMS error is 4.6394%, which is obtained at the cost of 40.79% average measurement of all pixels. By contrast, if the original image is sampled by the down-sampling rate of 2×1 and is interpolated, the average RMS error is 19.3118%. Thus, the algorithm provides more than 14% gain compared to the uniform measurement of pixels. The algorithm also performs very well even for very small size of aged areas (as small as 16×16 pixels). Table 1 summarizes the results for the chess and the random intensity chess aging patterns.

TABLE 1

Performance of the algorithm for simulated aging patterns

| | Chess | Random Int. Chess | Diamond | Random Int. diamond |
|---|---|---|---|---|
| Pattern size | 6 × 10 | 6 × 10 | 6 × 10 | 6 × 10 |
| Initial down-sampling rate | 4 × 4 | 4 × 4 | 4 × 4 | 4 × 4 |
| Initial RMS error % | 23.1 | 19.1 | 11.1 | 10.1 |
| Total pixel measurement % | 18 | 15 | 25.03 | 21.33 |
| Final RMS error % | 1.06 | 1.97 | 1.23 | 1.3 |
| Equivalent down-sampling rate | 2 × 3 | 2 × 3 | 2 × 2 | 2 × 2 |
| Equivalent RMS error % | 15 | 12.29 | 8.23 | 7.50 |
| Gain % | >13 | >10 | >7 | >6 |

Figure 6:
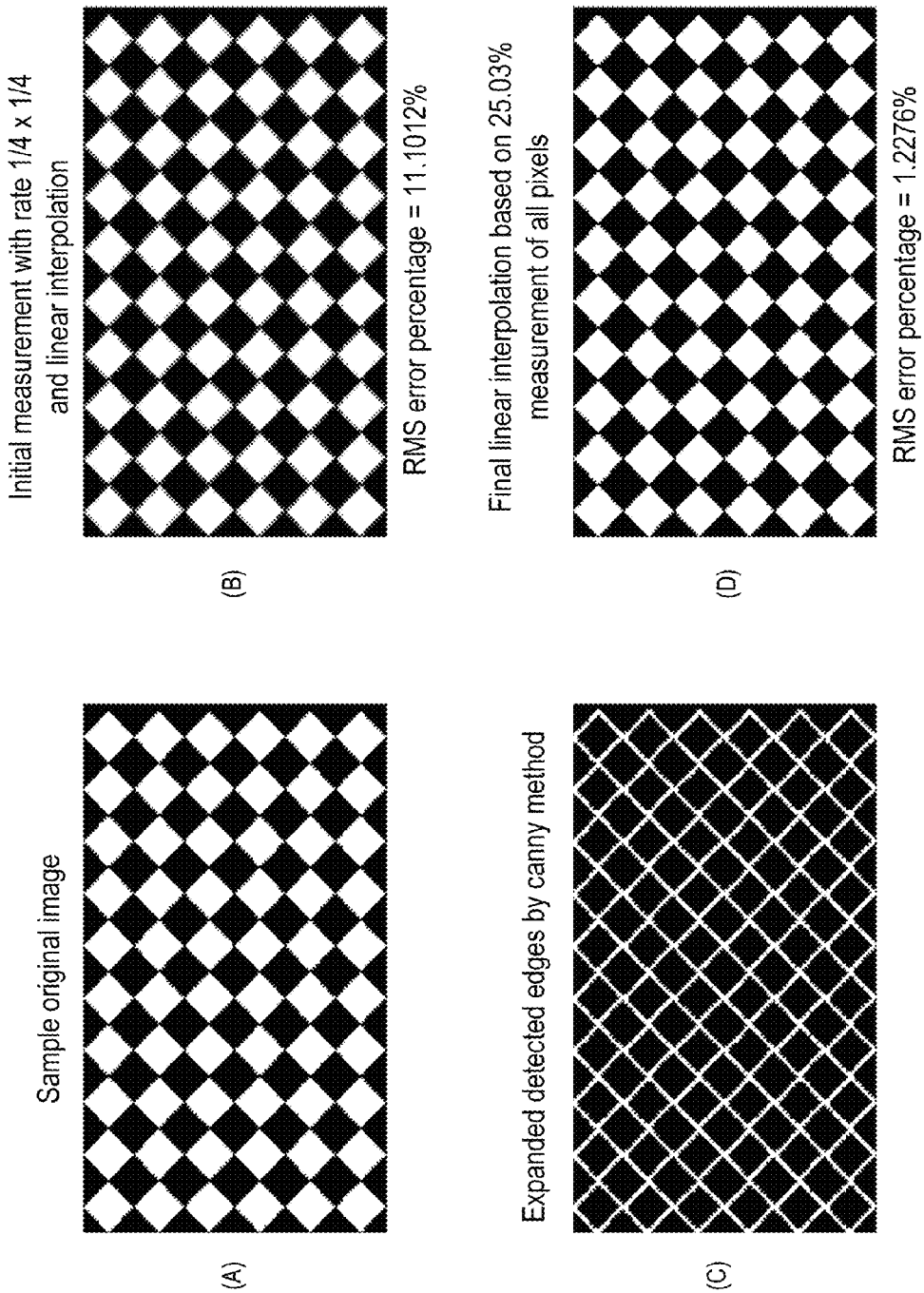
FIG. 6 illustrates the performance of the algorithm on the diamond aging pattern of size 6×10.
Figure 7:
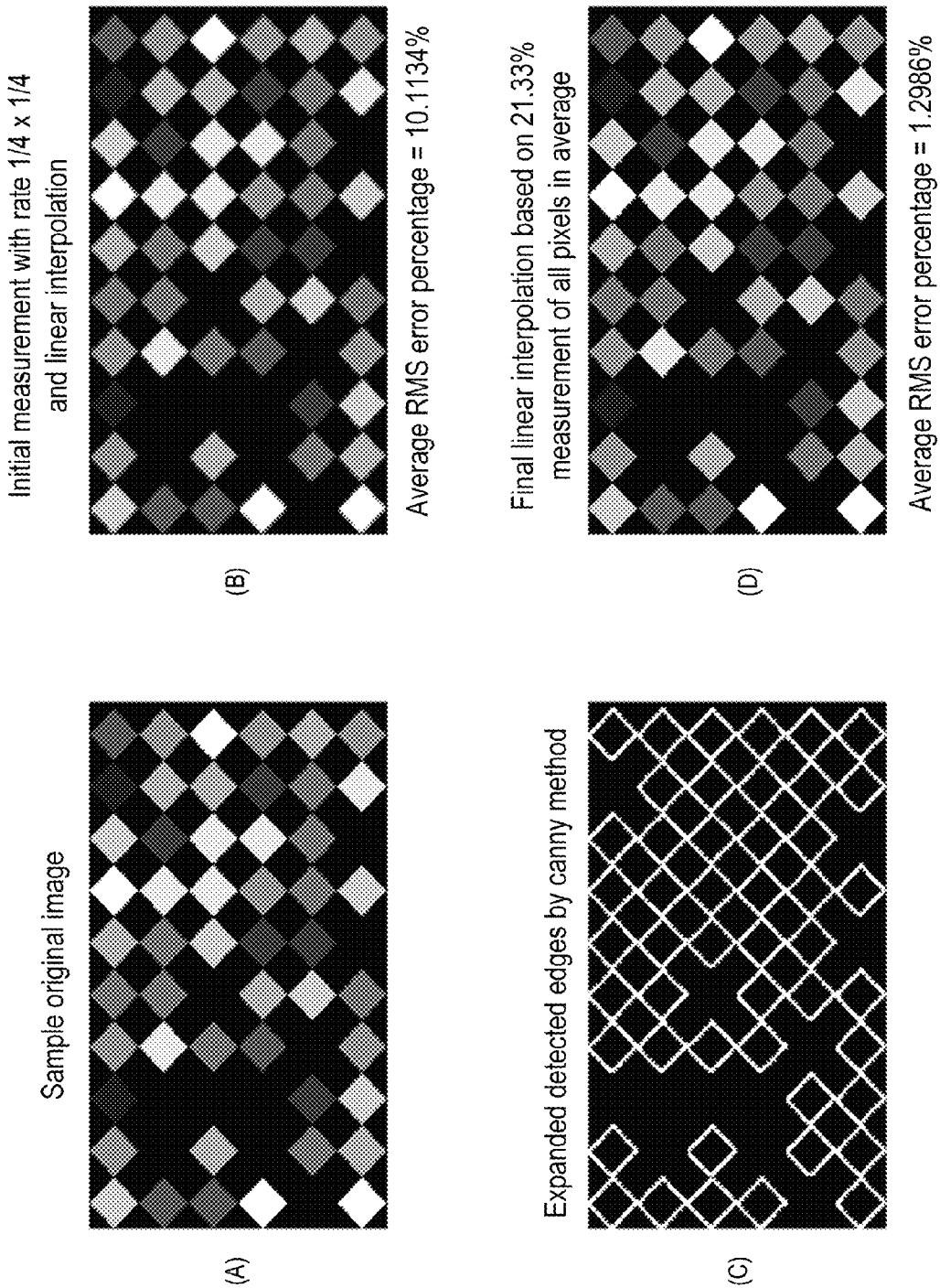
FIG. 7 illustrates the performance of the algorithm on the random intensity diamond pattern of size 6×10.

To verify the performance of the algorithm for edges with 45 and 135 edge direction degrees, a diamond aging pattern and the random intensity diamond pattern is designed as shown in FIGS. 6 and 7. The same simulation procedure as before is performed for both cases. In FIG. 6, the final RMS error is 1.2276%, which is obtained at the cost of 25.03% measurement of all pixels. For comparison, if the initial down-sampling rate equal to 2×2 is chosen, the RMS percentage error equal to 8.2349% is obtained. Thus, the algorithm provides more than 7% improvement in comparison to a uniform measurement of the pixels.

The algorithm was run 50 times for the random intensity diamond pattern and the results were averaged. The averaged final estimation error is 1.2986%, which is obtained at the cost of 21.33% percent measurement of all pixels on average. If the display is initially sampled with the down-sampling rate of 2×2 and the resulted data is linearly interpolated, the average RMS error is 7.5091%. Thus, the algorithm results in more than 6% improvement compared to a uniform pixel measurement approach. Table 1 above summarizes the results for the diamond and the random intensity diamond aging patterns.

Figure 8:
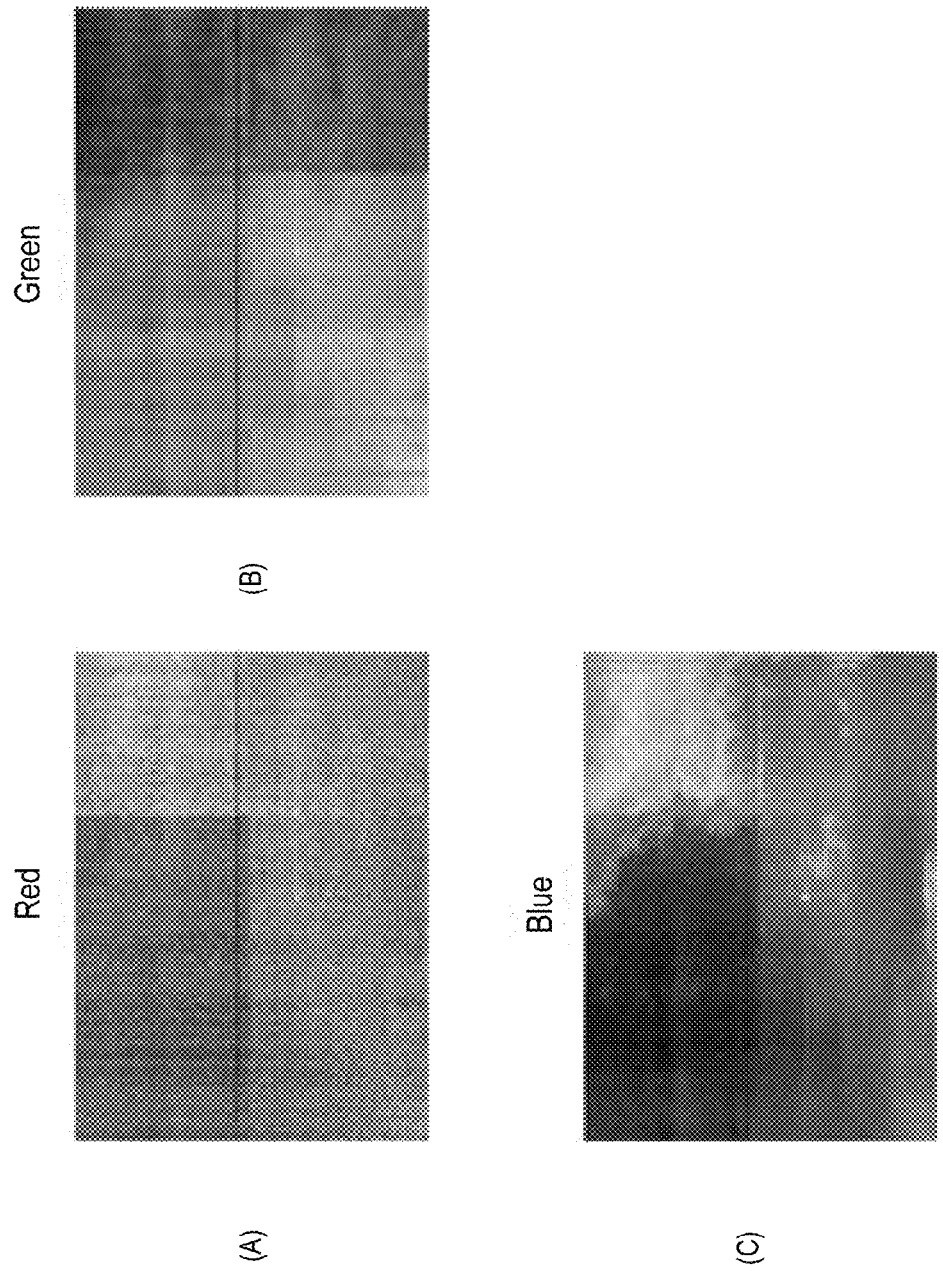
FIG. 8 illustrates $V_T$ initial non-uniformities for Red, Green, and Blue colors of an AMOLED display of size 512×648.

In the following section, the random intensity chess and the random intensity diamond aging patterns are considered on a background of initial non-uniformity measured from an AMOLED display of size 512×648 pixels. FIG. 8 illustrates the $V_T$ initial non-uniformity of this display for Red, Green, and Blue colors. In these images, those values that are away from the mean (m) more than 10 times the standard deviation ($\sigma$) are considered as false measurements and are replaced by the mean value. Those that are away from the mean 5 times the standard deviation are replaced by the boundary values, m±5$\sigma$. Then the data is filtered out by the 3×3 Gaussian filter to reduce the effect of the noise and to avoid pixel-by-pixel variation.

Figure 9:
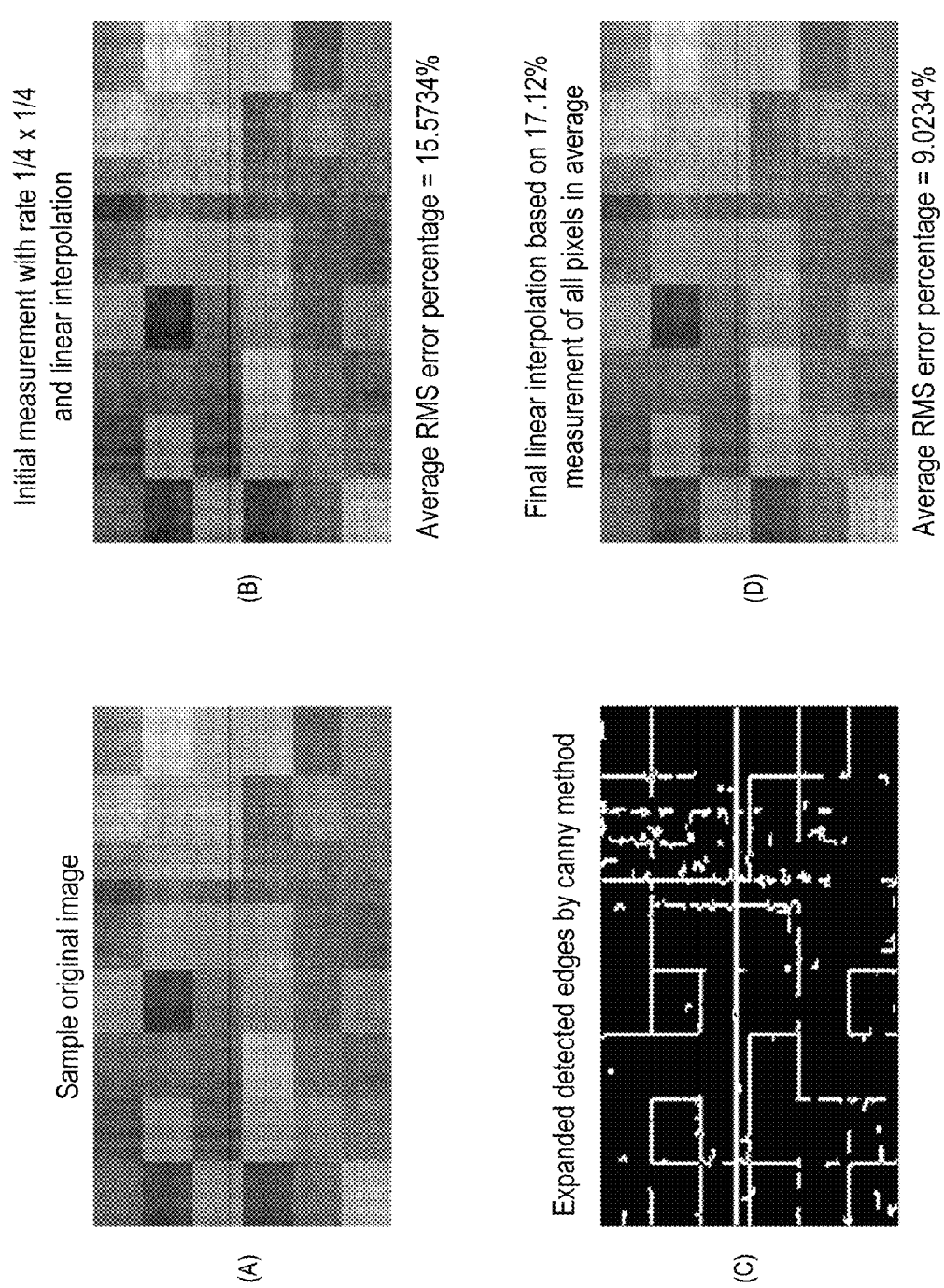
FIG. 9 shows the performance of the algorithm on the random intensity chess pattern with background real initial non-uniformity for red color.
Figure 10:
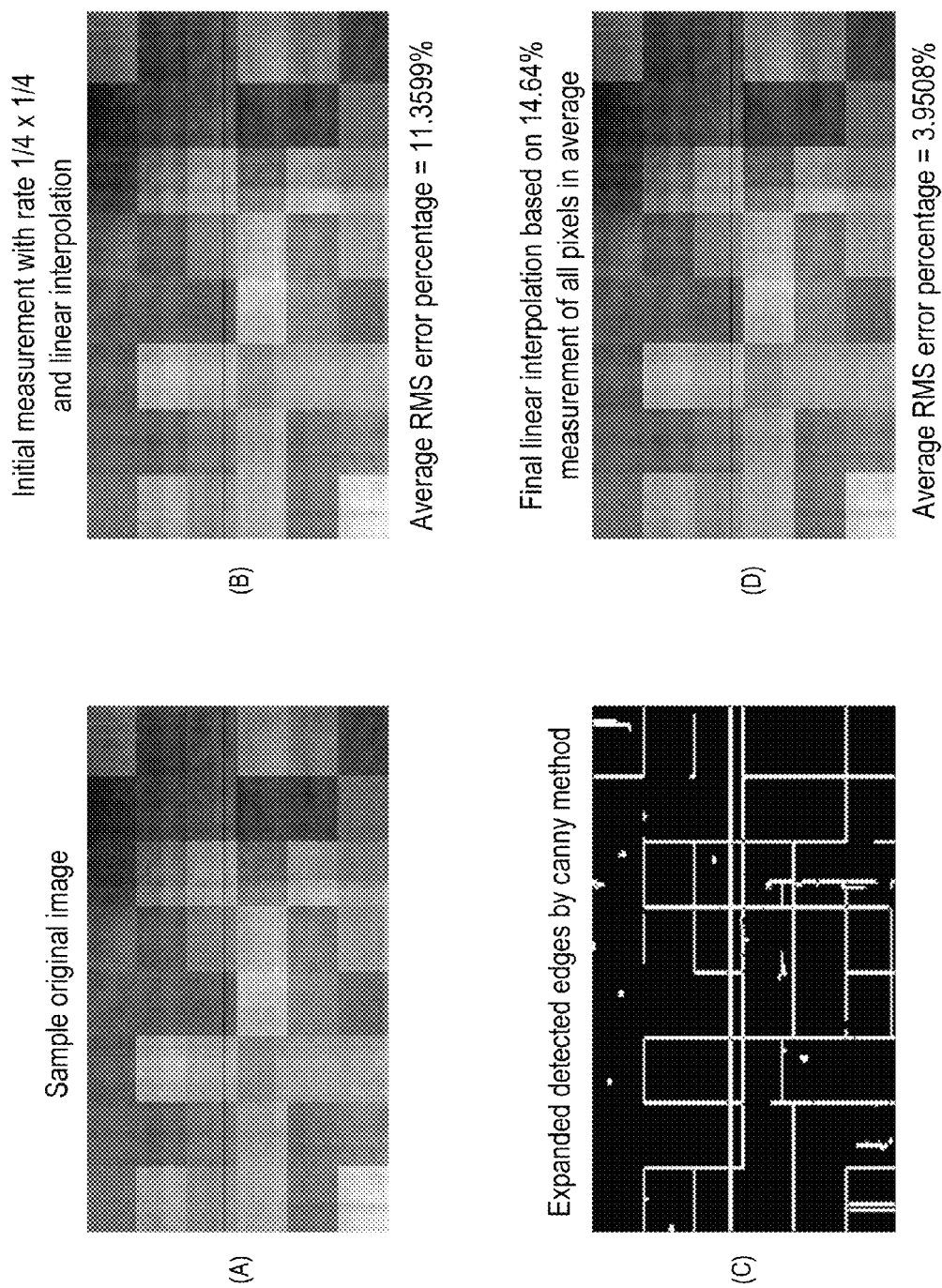
FIG. 10 shows the performance of the algorithm on the random intensity chess pattern with background real initial non-uniformity for green color.
Figure 11:
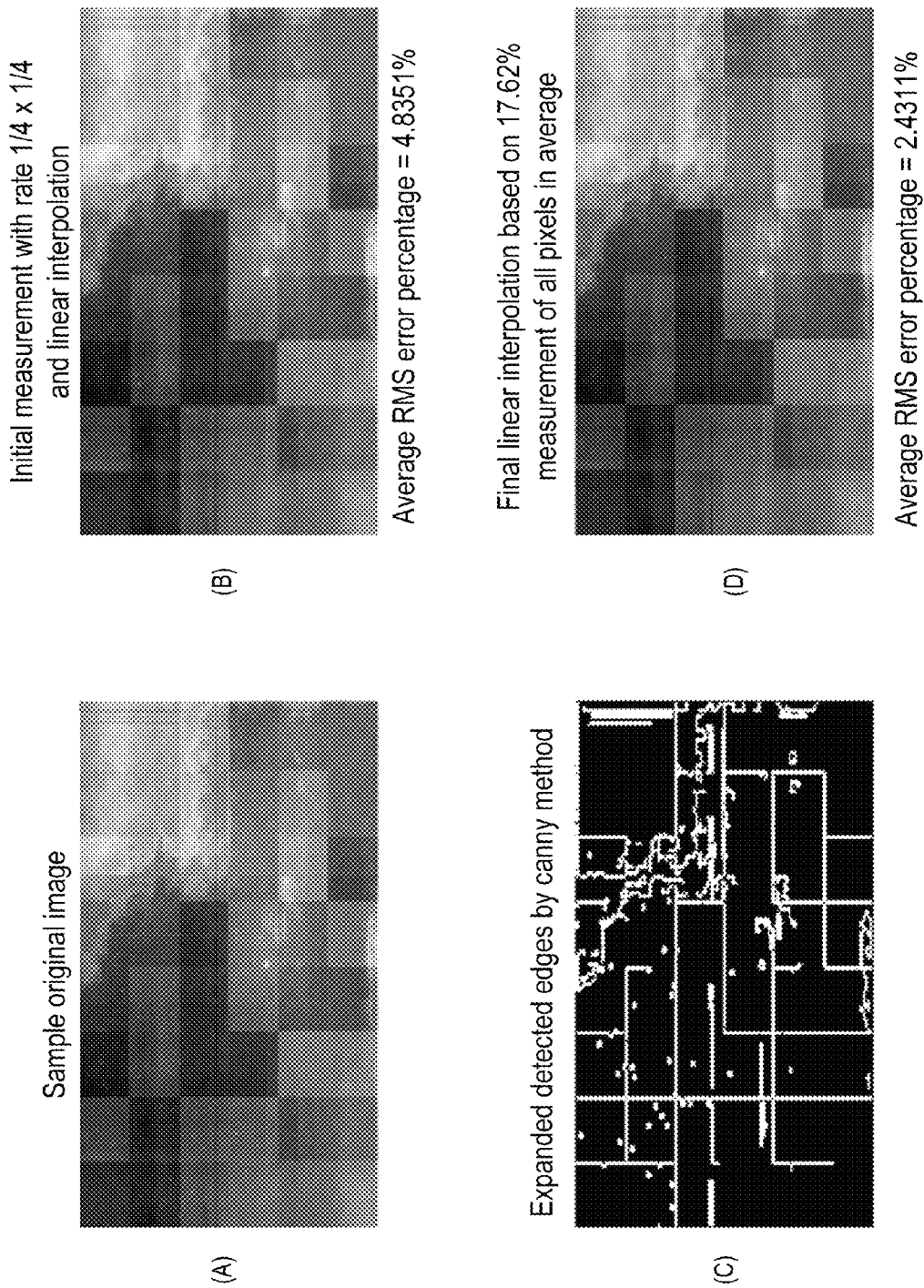
FIG. 11 shows the performance of the algorithm on the random intensity chess pattern with background real initial non-uniformity for blue color.

FIGS. 9, 10, and 11 show the performance of the algorithm for a random intensity chess pattern of size 6×10 with a background having real initial non-uniformity for red, green, and blue colors, respectively. The maximum intensity of the random chess pattern that is added to the initial non-uniformity data is 0.1 times the mean of the initial non-uniformity of the display. This means that the aging process is in an early stage, and the display is at most 10% aged compared to its original condition. The average RMS errors equal to 9, 3.95, and 2.43 percent are obtained at the cost of total 17.12, 14.64, and 17.62 percent measurement of all pixels on average respectively for red, green, and blue colors. To obtain the actual value of the performance improvement for each color, initial measurements of the display with a down-sampling rate of 2×3 were taken, which means that more than 16.6% of the pixels are measured uniformly. In this case, the average RMS errors equal to 14.7, 10.64, and 3.58 percent are obtained respectively for red, green, and blue colors. This translates to more than 5%, 6%, and 1% performance improvement respectively. The results are summarized in Table 2 below.

Figure 12:
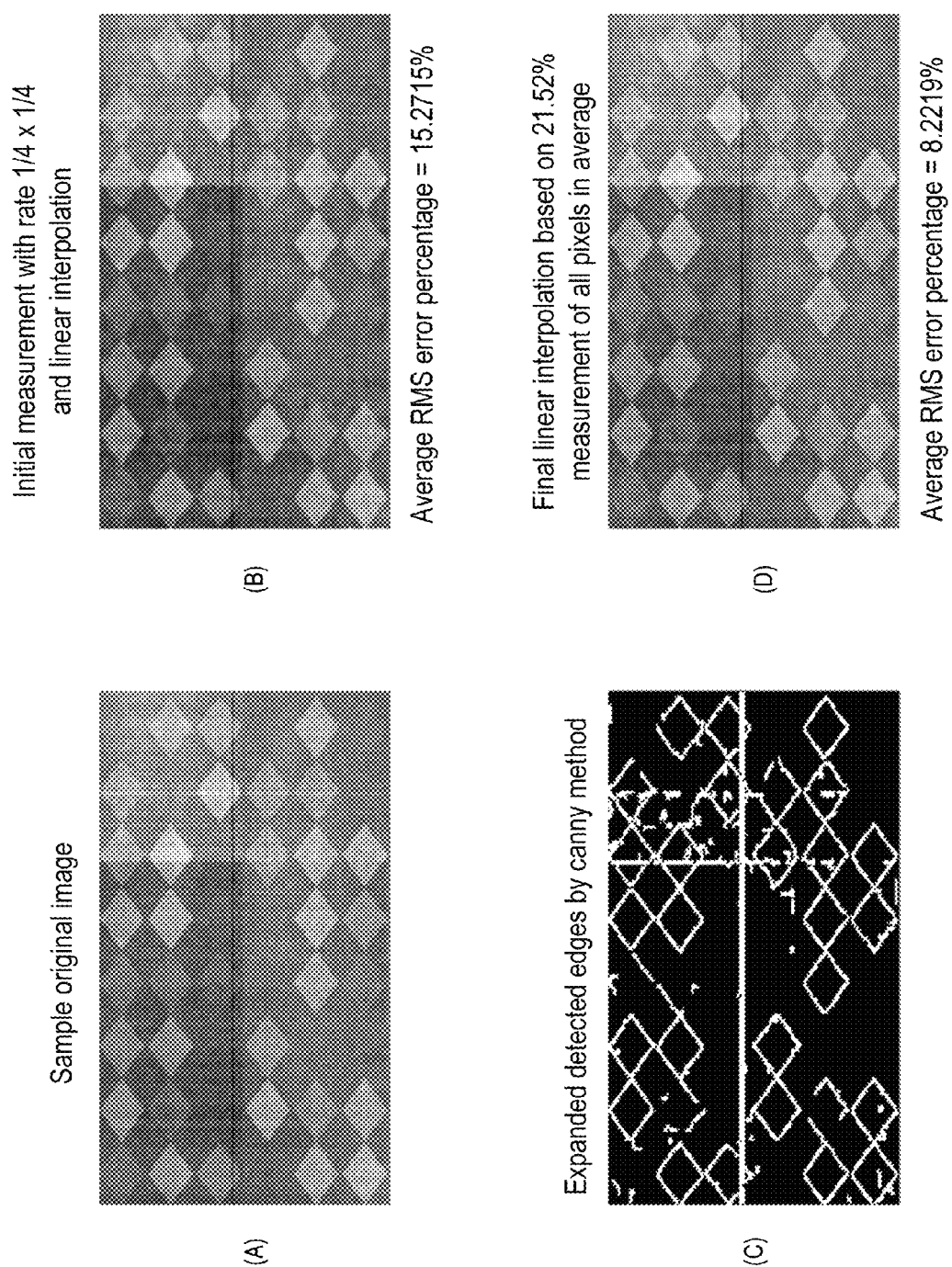
FIG. 12 shows the performance of the algorithm on the random intensity diamond pattern with the background of real initial non-uniformity for red color.
Figure 13:
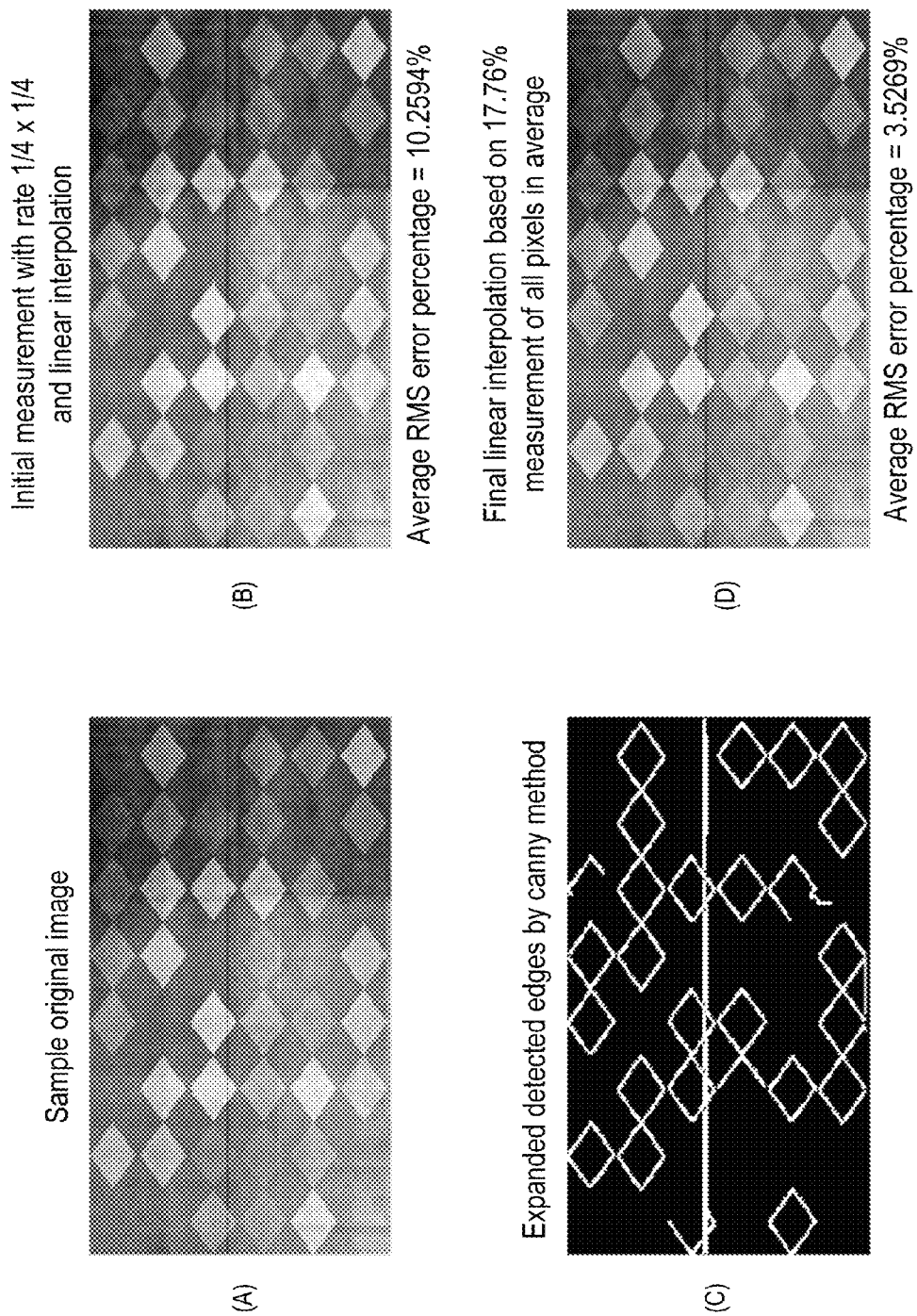
FIG. 13 shows the performance of the algorithm on the random intensity diamond pattern with the background of real initial non-uniformity for green color.
Figure 14:
FIG. 14 shows the performance of the algorithm on the random intensity diamond pattern with the background of real initial non-uniformity for blue color.
Figure 14:
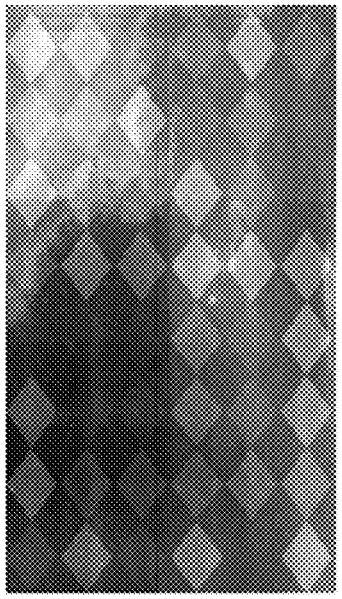
Figure 14:
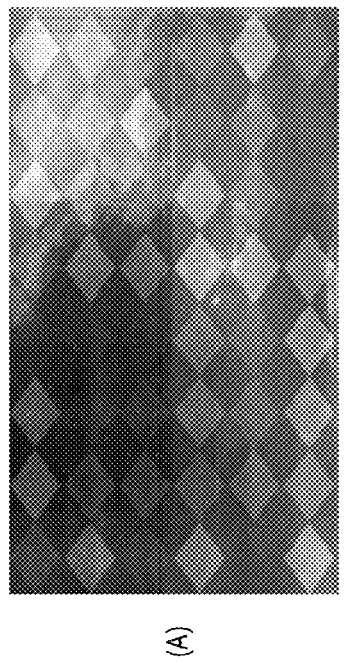
Figure 14:
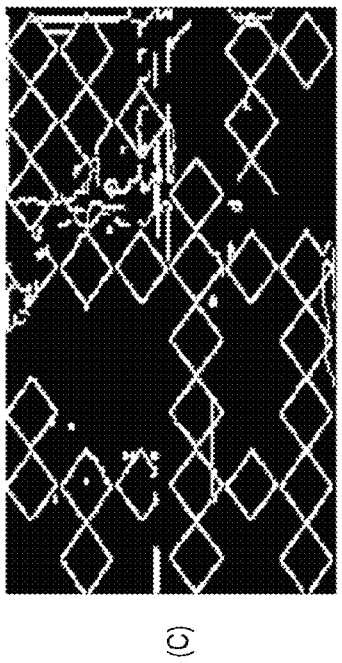

FIGS. 12-14 show the performance of the algorithm for a random intensity diamond pattern with a background having real initial non-uniformity respectively for red, green, and blue colors. Like previous simulations, the maximum intensity of the random diamond pattern that is added to the initial non-uniformity data is 0.1 times the mean of the initial non-uniformity of the display. Thus, the aging process is in an early stage, and the display is at most 10% aged compared to its original condition. The average RMS errors equal to 8.2, 3.5, and 2.65 percent are obtained at the cost of total 21.52, 17.76, and 19.01 percent measurement of all pixels on average respectively for red, green, and blue colors.

To obtain the actual value of the performance improvement for each color, two different scenarios of uniform pixel measurement are considered, and the average of the results is taken. In the first scenario, the pixels are uniformly measured with the down-sampling rate equal to 2×2. This means that more than 25% of the pixels are initially measured. Note that this number is much larger than the number of pixels measured using the algorithm for each color. The average RMS errors equal to 10, 7.24, and 2.34 percent are obtained respectively for red, green, and blue colors. Even in this scenario, the algorithm provides more than 1.8 and 3.5 percent gain for the red and green colors. The results for the blue color are very close. In another scenario, the initial down-sampling rate of 2×3 is chosen, which means that more than 16.6% of the pixels are measured. The averaged RMS errors of 14.15, 9.97, and 3.24 percent are obtained respectively for red, green, and blue colors. By taking the average of the results in both scenarios, the algorithm herein provides more than 3.9, 5.1, and 0.15 percent gain for red, green and blue colors compared to a strictly uniform pixel measurement approach. The results are summarized in Table 2.

TABLE 2

Performance of the algorithm for the simulated aging patterns with a background of real initial non-uniformity

|  | Random R | Intensity G | Chess B | Random R | Intensity G | diamond B |
|---|---|---|---|---|---|---|
| Pattern size |  | 6 × 8 |  |  | 6 × 8 |  |
| Initial down-sampling rate |  | 4 × 4 |  |  | 4 × 4 |  |
| Initial RMS error | 15.57 | 11.36 | 4.83 | 15.27 | 10.25 | 3.93 |
| Total Pixel measurement % | 17.12 | 14.64 | 17.62 | 21.52 | 17.76 | 19.01 |
| Final RMS error % | 9.02 | 3.95 | 2.43 | 8.22 | 3.53 | 2.65 |
| Equivalent down-sampling rate |  | 2 × 3 |  |  | 2 × 2, 2 × 3 |  |
| Equivalent RMS error % | 14.4 | 10.64 | 3.58 | 12.25 | 8.6 | 2.8 |
| Gain % | >5 | >6 | >1 | >3.9 | >5.1 | >0.15 |

The performance of the algorithm improves as the aging becomes more severe. In such a case, the edges are sharper and hence more vulnerable to be detected. In addition, assuming highly spatially correlated aged areas, most of the estimation error due to interpolation happen at the edges and their vicinity. Thus, pixel measurement at edges is more effective to reduce the estimation error. In general, the algorithm shows its best performance when it deals with highly spatially correlated areas with distinctive edges.

The algorithm herein includes an initial uniform pixel measurement and interpolation followed by an edge detection algorithm to recognize the areas that results in most part of the estimation error due to the interpolation. The pixels on the edges and their vicinity are also measured and aging pattern of the display is obtain by re-interpolation of the entire measured set of data for the initially measured pixels and the pixels around the detected edges. Numerical results on simulated aging patterns and real data demonstrate that the algorithm significantly outperforms the equivalent uniform pixel measurement counterpart. The algorithm performs particularly well for aging patterns that consist of highly spatially correlated areas with distinctive edges.

The simulation results presented here for real data are obtained based on only one set of real $V_T$ initial non-uniformity. More exact results are obtained by performing the same simulation for various sets of real data and averaging over the results.

There is a tradeoff in the choice of the initial down-sampling rate. It should be large enough to decrease the total number of pixel measurements as much as possible. At the same time, it should be small enough to capture important events (e.g., edges or corner points) of the image with a high probability. Clearly, if an edge is missed in the initial interpolation, it is not guaranteed to be recovered by the algorithm. Thus, edges that are expanded in an area smaller than the smallest area characterized by the down-sampling rate ($K_V \times K_H$ pixels), are vulnerable to be missed.

What is claimed is:

1. A method of compensating an image of a display for an aging of the display, the display comprising a plurality of pixels, each pixel comprising a light emitting device, the method comprising:
    measuring an aging characteristic of each pixel of a coarse subset of the pixels to produce initial pixel measurements;
    determining at least one local maximum of a gradient magnitude of the initial pixel measurements;
    measuring the aging characteristic of one or more pixels within a local vicinity of the determined at least one local maximum of the gradient magnitude to produce additional pixel measurements;
    producing an aging pattern based on the initial pixel measurements and the additional pixel measurements;
    storing the aging pattern in a memory device; and
    compensating an image of the display for the aging of the display with use of the aging pattern for improving image uniformity of the light emitting devices across the display.

2. The method of claim 1, wherein the coarse subset of the pixels comprises a spaced uniform distribution of pixels.

3. The method of claim 2, wherein the spaced uniform distribution of pixels comprises a spaced rectilinear distribution of pixels.

4. The method claim 3, wherein the spaced rectilinear distribution of pixels comprises at least some but not all pixels of the display using a down-sampling rate of $K_V \times K_H$, such that the aging characteristic of at least every $K_V$th pixel is measured along a column and the aging characteristic of at least every $K_H$th pixel is measured along a row.

5. The method of claim 1, wherein producing the aging pattern based on the initial pixel measurements and the additional pixel measurements comprises interpolating a combination of the initial pixel measurements and the additional pixel measurements.

6. The method of claim 5, wherein determining at least one local maximum of the gradient magnitude comprises interpolating the initial pixel measurements to produce an initial aging pattern and using an edge detection algorithm on the initial aging pattern.

7. The method of claim 5, wherein interpolating the combination of the initial pixel measurements and the additional pixel measurements generates estimated aging characteristics for pixels of the display other than those for which the initial pixel measurements and the additional pixel measurements were made.

8. The method of claim 1, wherein compensating an image of the display for the aging of the display with use of the aging pattern comprises:
    generating, with use of the aging pattern, an estimation matrix corresponding to a pixel resolution of the display for improving an image uniformity of the light emitting devices across the display,
    wherein each entry in the estimation matrix corresponds to a respective pixel of the display, and wherein each value of each entry in the estimation matrix corresponds to an amount by which the respective pixel is aging such that a corresponding compensation value is applied to increase the programmed brightness for the pixel to compensate for the amount of aging.

9. The method of claim 1, wherein the aging characteristic is related to a shift in a threshold voltage of a drive transistor that drives the light emitting device in each of the pixels.

10. The method of claim 1, wherein the aging characteristic is related to a change in a voltage across the light-emitting device in each of the pixels.

11. The method of claim 1, wherein the aging characteristic is related to a change in a drive current of the drive transistor needed to cause the light-emitting device in each of the pixels to emit a programmed brightness.

12. The method of claim 1, wherein the aging characteristic is related to a change in a current of the light emitting devices needed to emit a programmed brightness.

13. The method of claim 1, wherein determining the at least one local maximum of the gradient magnitude comprises performing Canny edge detection on the magnitudes of the initial pixel measurements.

* * * * *